United States Patent
Bi

(10) Patent No.: US 12,189,934 B2
(45) Date of Patent: Jan. 7, 2025

(54) VIDEO DATA PROCESSING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventor: Siyuan Bi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 50 days.

(21) Appl. No.: 17/964,147

(22) Filed: Oct. 12, 2022

(65) Prior Publication Data
US 2023/0039978 A1 Feb. 9, 2023

Related U.S. Application Data

(63) Continuation of application No. PCT/CN2021/106675, filed on Jul. 16, 2021.

(30) Foreign Application Priority Data

Sep. 14, 2020 (CN) .......................... 202010961575.5

(51) Int. Cl.
*G06F 3/04847* (2022.01)
*G06F 3/0486* (2013.01)
*G06F 3/04883* (2022.01)

(52) U.S. Cl.
CPC ........ *G06F 3/04847* (2013.01); *G06F 3/0486* (2013.01); *G06F 3/04883* (2013.01)

(58) Field of Classification Search
CPC .... G06F 3/048; G06F 3/04847; G06F 3/0486; G06F 3/04883; G06F 3/0416–4186; G06F 3/0488–04886; G06F 2203/04104
See application file for complete search history.

(56) References Cited

U.S. PATENT DOCUMENTS

| | | | |
|---|---|---|---|
| 10,691,329 B2 * | 6/2020 | Fan | ...................... G06F 3/04883 |
| 10,990,214 B2 * | 4/2021 | Checkley | ............... G11B 27/34 |

(Continued)

FOREIGN PATENT DOCUMENTS

| | | | | |
|---|---|---|---|---|
| CA | 2822812 A1 * | 7/2012 | ........... | G06F 3/0488 |
| CN | 103076985 A | 5/2013 | | |

(Continued)

OTHER PUBLICATIONS

International Search Report with English translation and Written Opinion regarding PCT/CN2021/106678 dated Oct. 14, 2021.

(Continued)

*Primary Examiner* — Liang Y Li
(74) *Attorney, Agent, or Firm* — Crowell & Moring LLP

(57) ABSTRACT

This application discloses a video data processing method and apparatus and a storage medium. The method includes: displaying a video playing interface corresponding to video data, and recognizing an operation gesture corresponding to a slide operation, determining, according to the slide operation, whether the operation gesture belongs to a first gesture type, in response to determining that the operation gesture belongs to the first gesture type, obtaining a start trigger position and an end trigger position of the slide operation from a slide trajectory of the slide operation, and determining, based on the start and end trigger positions, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

17 Claims, 14 Drawing Sheets

(56) References Cited

U.S. PATENT DOCUMENTS

| | | | |
|---|---|---|---|
| 2004/0246240 A1* | 12/2004 | Kolmykov-Zotov | ............... G06F 3/04883 345/179 |
| 2013/0120298 A1* | 5/2013 | Zhou | ............... G06F 3/04842 345/173 |
| 2015/0128042 A1* | 5/2015 | Churchill | ............... G06F 3/0488 715/718 |
| 2017/0115796 A1* | 4/2017 | Jiang | ............... G06F 3/04883 |
| 2017/0285870 A1* | 10/2017 | Wang | ............... G06F 3/0418 |
| 2018/0121079 A1 | 5/2018 | Li et al. | |
| 2020/0341613 A1* | 10/2020 | Gu | ............... G06F 3/04883 |
| 2020/0371675 A1* | 11/2020 | Sung | ............... G06F 3/04883 |

FOREIGN PATENT DOCUMENTS

| | | | | |
|---|---|---|---|---|
| CN | 103179465 A | | 6/2013 | |
| CN | 103329075 A | | 9/2013 | |
| CN | 105516783 A | | 4/2016 | |
| CN | 105898593 A | | 8/2016 | |
| CN | 106095300 A | | 11/2016 | |
| CN | 106412706 A | | 2/2017 | |
| CN | 107229410 A | * | 10/2017 | ......... G06F 3/04817 |
| CN | 112104915 A | | 12/2020 | |
| WO | WO-2012094479 A1 | * | 7/2012 | ........... G06F 3/0484 |

OTHER PUBLICATIONS

First Chinese Office Action with English concise explanation of relevance regarding 202010961575.5 dated Apr. 6, 2021.
Second Chinese Office Action with English concise explanation of relevance regarding 202010961575.5 dated Oct. 9, 2021.

* cited by examiner

VIDEO DATA PROCESSING METHOD AND APPARATUS, COMPUTER DEVICE, AND STORAGE MEDIUM

RELATED APPLICATION

This application is a continuation application of PCT Patent Application No. PCT/CN2021/106675, filed on Jul. 16, 2021, which claims priority to Chinese Patent Application No. 202010961575.5, filed with the China National Intellectual Property Administration on Sep. 14, 2020, both of which are incorporated herein by reference in their entireties.

FIELD OF THE TECHNOLOGY

This application relates to the field of computer technologies, and in particular, to a video data processing method and apparatus, a computer device, and a storage medium.

BACKGROUND OF THE DISCLOSURE

Currently, when a user is playing a video program (for example, video program A) in an application client (for example, video client), X speed playing may be implemented on a video playing interface corresponding to the video program A by triggering a designated position region of a touchscreen corresponding to the video playing interface. For example, when obtaining a trigger operation (for example, click operation) performed by the user for a left-side position region of the touchscreen, the application client may perform 2× speed rewinding processing on video data of the video interface A through a player of the application client. In another example, when obtaining a trigger operation (for example, single-click operation) performed by the user for a right-side position region of the touchscreen, the application client may further perform 2× speed fast-forwarding processing on video data of the video interface A.

SUMMARY

Embodiments of this application provide an image processing method and apparatus and a related device for processing video data, thereby subsequently improving precision of performing playing progress control on the video data and/or improving the field of multimedia control and/or transmission.

The present disclosure describes a method for processing video data. The method includes displaying, by a device, a video playing interface corresponding to video data, and recognizing an operation gesture corresponding to a slide operation performed on the video playing interface. The device includes a memory storing instructions and a processor in communication with the memory. The method also includes determining, by the device according to the slide operation, whether the operation gesture belongs to a first gesture type, wherein the first gesture type is used for adjusting a playing progress of the video data by a preset progress duration; in response to determining that the operation gesture belongs to the first gesture type, obtaining, by the device, a start trigger position and an end trigger position of the slide operation from a slide trajectory of the slide operation; and determining, by the device based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

The present disclosure describes an apparatus for processing video data. The apparatus includes a memory a memory storing instructions; and a processor in communication with the memory. When the processor executes the instructions, the processor is configured to cause the apparatus to perform: displaying a video playing interface corresponding to video data, and recognizing an operation gesture corresponding to a slide operation performed on the video playing interface, determining, according to the slide operation, whether the operation gesture belongs to a first gesture type, wherein the first gesture type is used for adjusting a playing progress of the video data by a preset progress duration, in response to determining that the operation gesture belongs to the first gesture type, obtaining a start trigger position and an end trigger position of the slide operation from a slide trajectory of the slide operation, and determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

The present disclosure describes a non-transitory computer-readable storage medium, storing computer-readable instructions. The computer-readable instructions, when executed by a processor, are configured to cause the processor to perform: displaying a video playing interface corresponding to video data, and recognizing an operation gesture corresponding to a slide operation performed on the video playing interface, determining, according to the slide operation, whether the operation gesture belongs to a first gesture type, wherein the first gesture type is used for adjusting a playing progress of the video data by a preset progress duration, in response to determining that the operation gesture belongs to the first gesture type, obtaining a start trigger position and an end trigger position of the slide operation from a slide trajectory of the slide operation, and determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

Another aspect of embodiments of this application provides a video data processing method, including:
  displaying a video playing interface corresponding to video data, and recognizing, in response to a slide operation performed for the video playing interface, an operation gesture corresponding to the slide operation;
  obtaining, in a case of recognizing that the operation gesture belongs to a first gesture type, a start trigger position and an end trigger position of the slide operation from a slide trajectory corresponding to the first gesture type, the first gesture type being used for adjusting a playing progress of the video data by a preset progress duration; and
  determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

An aspect of the embodiments of this application provides a video data processing apparatus, including:
- a response recognizing module, configured to display a video playing interface corresponding to video data, and recognize, in response to a slide operation performed for the video playing interface, an operation gesture corresponding to the slide operation;
- a position obtaining module, configured to obtain, in a case of recognizing that the operation gesture belongs to a first gesture type, a start trigger position and an end trigger position of the slide operation from a slide trajectory corresponding to the first gesture type, the first gesture type being used for adjusting a playing progress of the video data by a preset progress duration; and
- a progress control module, configured to determine, based on the start trigger position and the end trigger position, a slide direction indicated by the slide trajectory, adjust, based on the slide direction and a progress control direction of a progress bar in the video playing interface, the playing progress of the video data by the preset progress duration, and display, on the video playing interface, playing-progress-adjusted video data.

An aspect of the embodiments of this application provides a computer device, including: a processor and a memory, the processor being connected to the memory, the memory being configured to store program code, and the processor being configured to invoke the program code, to perform the method according to the one aspect of the embodiments of this application.

An aspect of the embodiments of this application provides a computer-readable storage medium, storing a computer program, the computer program including program instructions, the program instructions, when executed by a processor, performing the method according to the one aspect of the embodiments of this application.

An aspect of the embodiments of this application provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, to cause the computer device to perform the method according to the one aspect of the embodiments of this application.

DESCRIPTION OF EMBODIMENTS

Figure 1:
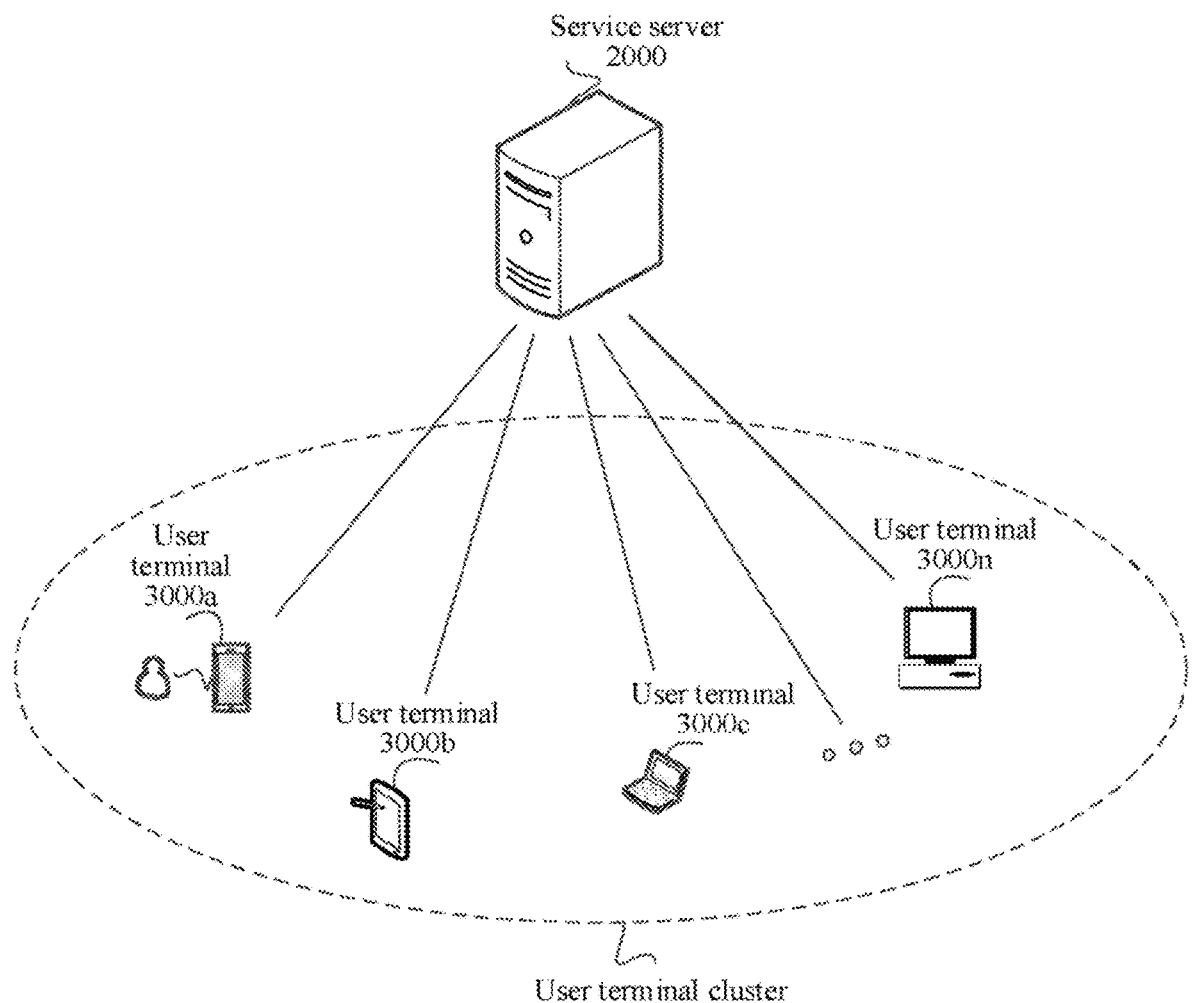
FIG. 1 is a schematic structural diagram of a network architecture according to an embodiment of the present invention.

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts fall within the protection scope of this application.

When obtaining a video playing interface corresponding to video data, a computer device in the embodiments of this application may recognize, in response to a slide operation performed for the video playing interface, an operation gesture corresponding to the slide operation. It may be understood that, in the embodiments of this application, a slide operation performed by a user for any position region in the video playing interface may be received, and a gesture corresponding to the received slide operation may be further recognized. It is to be understood that, the operation gesture herein may be determined by a trajectory corresponding to the slide operation. The operation gesture may be approximately classified into a first gesture type (or referred as a gesture of a first type) and a second gesture type (or referred as a gesture of a second type). For example, the first gesture type herein may be a swipe gesture, and the swipe gesture may be used for triggering a function of precisely controlling a progress duration. In another example, the second gesture type herein may be a drag gesture, and the drag gesture may be used for triggering a function of controlling playing of a progress bar. Therefore, further, the computer device may obtain, in a case of recognizing that the operation gesture belongs to the first gesture type (that is, the foregoing swipe gesture), a start trigger position and an end trigger position of the slide operation from a slide trajectory corresponding to the first gesture type, to determine, based on the start trigger position and the end trigger position, a slide direction indicated by the slide trajectory. Further, the computer device may control a playing progress of the video data based on the slide direction and a progress control direction of a progress bar in the video playing interface, for example, may fast-forward or rewind the video data precise to seconds, to display playing-progress-adjusted video data on the video playing interface. Therefore, it can be seen that, in the embodiments of this application, during playing of video data, a slide operation may be performed in any position region of a touchscreen, to start, in a case of recognizing that an operation gesture corresponding to the slide operation belongs to a first gesture type (for example, swipe gesture), a function of precisely controlling a progress duration, so that when a start trigger position and an end trigger position are obtained from a slide trajectory corresponding to the first gesture type subsequently, a slide direction indicated by the slide trajectory may be determined based on the start trigger position and the end trigger position, and then the playing progress may be accurately controlled based on the slide direction and the foregoing progress control direction, to ensure that playing precision of the video data can be accurately controlled.

In some embodiments, the swipe gesture is a gesture that a single finger presses a touchscreen and slides quickly toward any direction. Different from the drag gesture, at the moment of swiping on the touchscreen, the swipe gesture leaves the screen without generating continuous pressing.

FIG. 1 is a schematic structural diagram of a network architecture according to an embodiment of the present invention. As shown in FIG. 1, the network architecture may include a service server 2000 and a user terminal cluster. A network medium data system to which the network architecture is applicable may include a system with an audio and video processing function such as a social networking system or a video playing system.

It may be understood that, the user terminal cluster may include one or more user terminals, and the quantity of user terminals in the user terminal cluster is not limited herein. As shown in FIG. 1, the plurality of user terminals in the user terminal cluster may specifically include a user terminal 3000a, a user terminal 3000b, a user terminal 3000c, . . . , and a user terminal 3000n. As shown in FIG. 1, the user terminal 3000a, . . . , and the user terminal 3000n may each establish a network connection to the service server 2000, so that each user terminal in the user terminal cluster can exchange data with the service server 2000 through the network connection.

The server 2000 shown in FIG. 1 may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communications, a middleware service, a domain name service, a security service, a content delivery network (CDN), and a big data and artificial intelligence platform.

For ease of understanding, in this embodiment of this application, one user terminal may be selected from the user terminal cluster shown in FIG. 1 as a target user terminal. For example, in this embodiment of this application, the user terminal 3000a shown in FIG. 1 may be used as the target user terminal. An application client with a video data processing function (for example, video data loading and playing function) may be integrated in the target user terminal. The application client may specifically include a client with a frame sequence (for example, frame animation sequence) loading and playing function such as a social client, a multimedia client (for example, video client), an entertainment client (for example, song selection client), or an education client. The target user terminal (for example, user terminal 3000a) may specifically include: an intelligent terminal carrying a video data processing function (for example, video data playing function) such as a smartphone, a tablet computer, a notebook computer, a desktop computer, a wearable device, or an intelligent household appliance (for example, intelligent television). For ease of understanding, in this embodiment of this application, video data (such as, video program or movie) that is selected by a user (for example, user B) in an application client (for example, video client A) and in which the user is interested may be collectively referred to as target video data.

It may be understood that, service scenarios to which the foregoing network medium data system is applicable may specifically include: an entertainment program broadcast on-demand scenario, an offline cinema movie-watching scenario, an offline classroom lecture-attending scenario, and the like. The service scenarios to which the network medium data system is applicable are not enumerated herein.

For example, in the entertainment program on-demand scenario, the target video data herein may be an entertainment program that is selected by the foregoing user B in a video recommending interface (such as, video program recommending list) and in which the user is interested. For example, the entertainment program may be a television program, a variety program, or the like that is selected by the user B in the video program recommending list and whose recording is participated in by a public figure in which the user is interested. For example, the public figure herein may be a movie and television star or an entertainment star. In another example, in the offline cinema movie-watching scenario, the target video data herein may be a movie that is selected by the user B in a video recommending interface (such as, movie recommending list) and in which the user is interested. For example, the movie herein may be a movie program or the like that is selected by the user B in the movie recommending list and whose recording is participated in by a public figure in which the user is interested. For example, in the offline classroom lecture-attending scenario, the target video data herein may be a course that is selected by the foregoing user B in a video recommending interface (such as, course recommending list) and in which the user is interested. For example, the course herein may be a teaching course or the like that is selected by the user B in the course recommending list and that is recorded by a teacher in which the user is interested.

Figure 2:
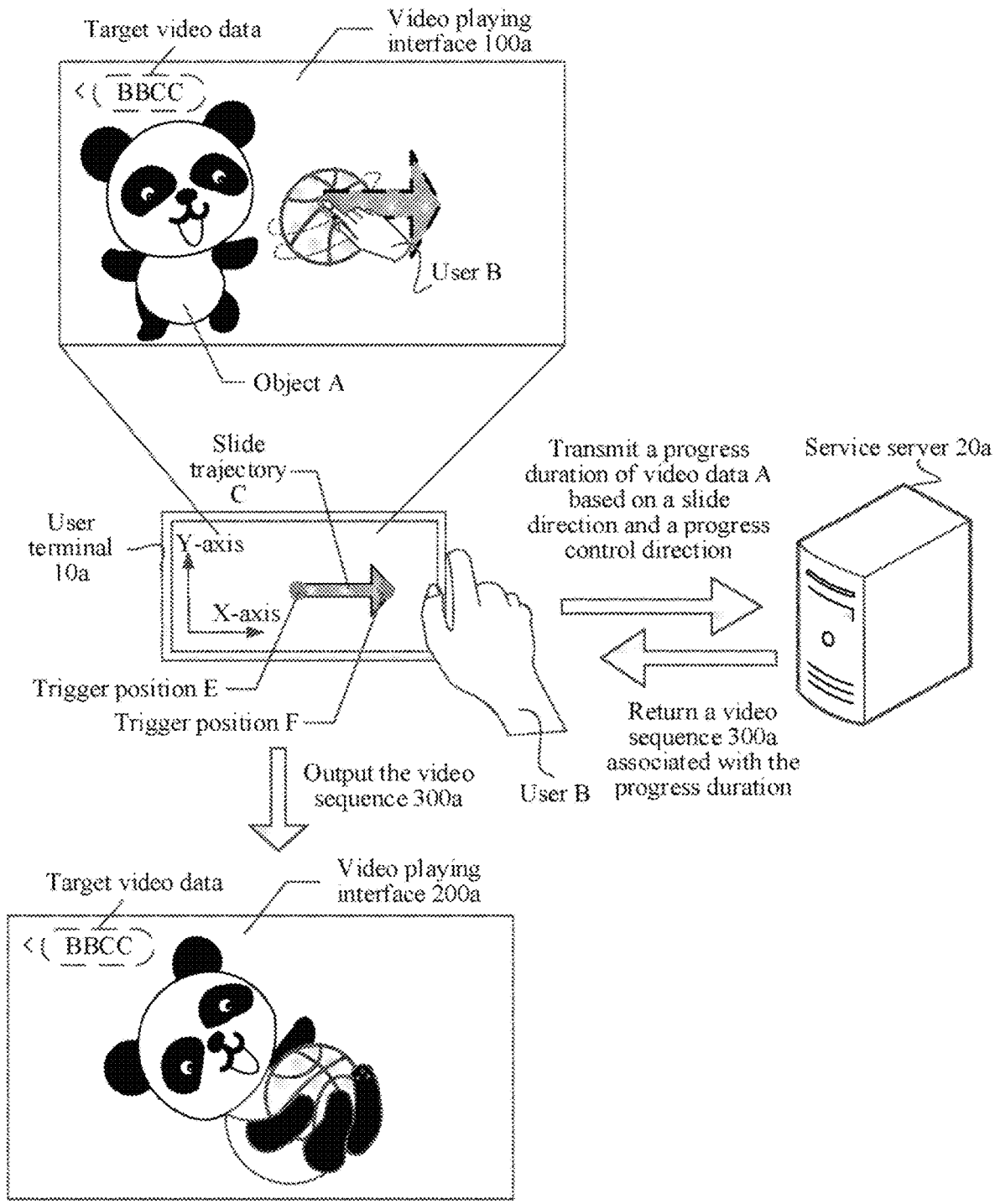
FIG. 2 is an interaction diagram of a scenario of performing data exchange according to an embodiment of this application.

For ease of understanding, in this embodiment of this application, the entertainment program on-demand scenario is used as an example, to describe how to implement, in the entertainment program on-demand scenario, a rewinding function or fast-forwarding function precise to seconds when a direction of a first gesture type (that is, swipe gesture) on a touchscreen is recognized. For ease of understanding, further, FIG. 2 is an interaction diagram of a scenario of performing data exchange according to an embodiment of this application. A server 20a shown in FIG. 2 may be the service server 2000 in the embodiment corresponding to FIG. 1, and a user terminal 10a shown in FIG. 2 may be a user terminal used by a user B shown in FIG. 2. When needing to accurately control a playing progress of video data (for example, target video data in FIG. 2) in the entertainment program on-demand scenario, the user B may perform a slide operation at any position on a touchscreen of the user terminal 10a shown in FIG. 2 with a finger. In a case that the slide operation is a swipe operation along a particular direction, an operation gesture corresponding to the slide operation may be collectively referred to as a first gesture type, and then the foregoing fast-forwarding function or rewinding function precise to seconds may be triggered. The target video data may be video data corresponding to an entertainment program whose program name is "BBCC" and that is shown in FIG. 2.

A video playing interface 100a shown in FIG. 2 and a video playing interface 200a shown in FIG. 2 respectively corresponds to video frames of the same object (for example, object A shown in FIG. 2, where the object A may be a panda) at different moments. For example, the video playing interface 100a shown in FIG. 2 may be a display interface corresponding to a video frame (for example, video frame A1 including the object A) displayed on the user terminal 10a when the user B performs a slide operation at a moment T1 (for example, 20th minute and 25th second). In another example, the video playing interface 200a shown in FIG. 2 may be a display interface corresponding to a video frame (for example, video frame A2 including the object A) displayed on the user terminal 10a at a moment T2 (for example, 20th minute and 30th second) after the user B completes the slide operation.

A time difference between the moment T1 and the moment T2 may be a progress duration (for example, 5 seconds) used for adjusting video data and shown in FIG. 2. As shown in FIG. 2, a slide trajectory of the user B on the touchscreen captured by the user terminal 10a may be a slide trajectory C shown in FIG. 2, where a trigger position E in the slide trajectory C may be position information of a first screen touch point generated when the user B continuously slides (namely, continuously swipes) on the touchscreen. In this embodiment of this application, the position information of the first screen touch point may be collectively referred to as a start trigger position of the slide operation. Similarly, a trigger position F in the slide trajectory C may be position information of an $N^{th}$ (that is, last) screen touch point generated when the user B continuously slides (namely, continuously swipes) on the touchscreen, where N may be a positive integer. In addition, in this embodiment of this application, the position information of the $N^{th}$ screen touch point may be collectively referred to as an end trigger position of the slide operation.

It is to be understood that, in this embodiment of this application, a slide direction indicated by the slide trajectory C may be determined based on the start trigger position and the end trigger position determined from the slide trajectory C, and then whether the slide direction is consistent with a progress control direction of a progress bar in the video playing interface 100a may be determined; and if it is determined that they are consistent, it may be determined that the user B intends to fast-forward by 5 seconds. In this case, in a case that the user terminal 10a may determine that the slide direction of the user B on the touchscreen is the same as the progress control direction (for example, direction of an X-axis in FIG. 2), a video data loading request including the progress duration is further transmitted to a service server 20a shown in FIG. 2, to enable the service server 20a to obtain, based on the video data loading request, a video sequence 300a shown in FIG. 2 from a service database corresponding to the target video data. It may be understood that, in this embodiment of this application, the video sequence 300a in FIG. 2 may be collectively referred to as a first video sequence associated with the fast-forwarding duration. The fast-forwarding duration is the foregoing progress duration of 5 seconds.

It may be understood that, in this embodiment of this application, the foregoing moment T1 may be collectively referred to as an initial time stamp of the slide operation. It may be understood that, when transmitting the foregoing fast-forwarding duration (for example, 5 seconds) to the service server 20a, the user terminal 10a may further transmit the initial time stamp to the service server 20a, to enable the service server to determine, based on the initial time stamp and the fast-forwarding duration, a target time stamp corresponding to the foregoing fast-forwarding function. It may be understood that, in this embodiment of this application, a target time stamp corresponding to a first video frame of the foregoing first video sequence may collectively referred to as a first target time stamp. Further, it may be understood that, in this case, the service server 20a may use a video frame corresponding to the first target time stamp (that is, the foregoing video frame A2 corresponding to the moment T2) as the first video frame, to return a video sequence with the foregoing video frame A2 as the first video frame (that is, the video sequence 300a shown in FIG. 2) to the user terminal 10a. Further, as shown in FIG. 2, when obtaining the video sequence 300a, the user terminal 10a may extract the foregoing video frame A2 from the video sequence 300a, so that the user terminal 10a may fast-forward the video frame of the target video data from the foregoing video frame A1 to the video frame A2, to perform accurate playing progress adjustment on the progress duration of the video data in the user terminal 10a, thereby displaying the video frame A2 in the video playing interface 200a shown in FIG. 2. It may be understood that, in this embodiment of this application, the video sequence 300a may be displayed in the user terminal 10a, and the video sequence 300a displayed in the user terminal 10a is collectively referred to as playing-progress-adjusted video data displayed on the video playing interface.

For specific implementations in which the user terminal 10a recognizes the operation gesture corresponding to the slide operation and controls the playing progress of the video data, reference may be made to the following embodiments corresponding to FIG. 3 to FIG. 12.

Figure 3:
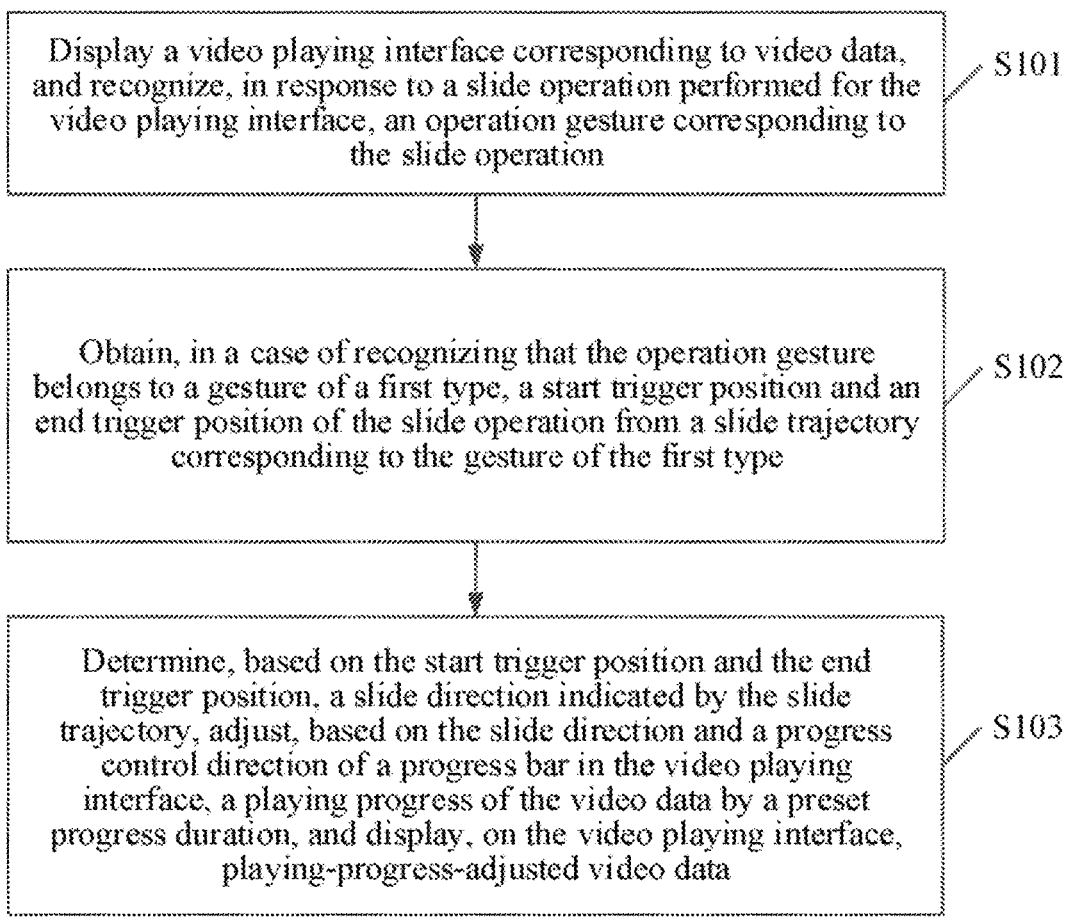
FIG. 3 is a schematic flowchart of a video data processing method according to an embodiment of this application.

Further, FIG. 3 is a schematic flowchart of a video data processing method according to an embodiment of this application. As shown in FIG. 3, the method may be performed by a user terminal corresponding to the foregoing user B (that is, the foregoing target user terminal, for example, the target user terminal may be the foregoing user terminal 10a shown in FIG. 2), may be performed by a service server (for example, the foregoing server 20a shown in FIG. 2), or may be performed by a user terminal and a service server jointly. For ease of understanding, this embodiment is described using an example in which the method is performed by the user terminal corresponding to the foregoing user B (that is, the target user terminal), to describe a specific process in which the operation gesture corresponding to the slide operation is recognized and the playing progress of the video data is controlled in the user terminal. The method may include at least the following step S101 to step S103:

Step S101. Displaying a video playing interface corresponding to video data, and recognizing, in response to a slide operation performed for the video playing interface, an operation gesture corresponding to the slide operation.

In some implementations, step S101 may include displaying, by a device comprising a memory storing instructions and a processor in communication with the memory, a video playing interface corresponding to video data, and recognizing an operation gesture corresponding to a slide operation performed on the video playing interface.

Specifically, the user terminal may display, in response to a startup operation for an application client, an application display interface corresponding to the application client. Further, the user terminal may display, in response to a playing operation for video data in the application display interface, a video playing interface corresponding to the video data. The video data may be selected by a user corresponding to the application client from recommended video data presented on the application display interface. In some embodiments, the video data herein may alternatively be obtained after the user performs video search through a search region in the application display interface, which is not limited herein. Further, the user terminal may record, in response to a slide operation performed for the video playing interface, a slide associated parameter associated with the slide operation; and. Further, the user terminal may recognize, based on the slide associated parameter, an operation gesture corresponding to the slide operation.

It may be understood that, the application client may be a video client with an audio and video playing function, for example, the video client in the foregoing embodiment corresponding to FIG. 2. When performing a startup operation for the video client, a user (for example, user B) may transmit a service data recommending request to a service server corresponding to the video client (for example, the service server 20a in the foregoing embodiment corresponding to FIG. 2), so that when obtaining the service data recommending request, the service server may pull a plurality of pieces of video data interesting the user (for example, user B) from a service database corresponding to the service server, and then may return these pieces of video data to a user terminal on which the video client is run, to display these pieces of video data in an application display interface corresponding to the user terminal. It may be understood that, in this embodiment of this application, a video recommending interface used for presenting these pieces of video data may be collectively referred to as an application display interface corresponding to the application client (that is, video client), that is, these pieces of video data presented in the application display interface may be the foregoing recommended video data. It may be understood that, the application display interface may be used for presenting one or more pieces of recommended video data interesting the user B, and may be further used for presenting the foregoing search region. In this way, the user B may further input, in the search region, text information (for example, video name or movie and television star) of other video data in which the user is interested.

Figure 4:
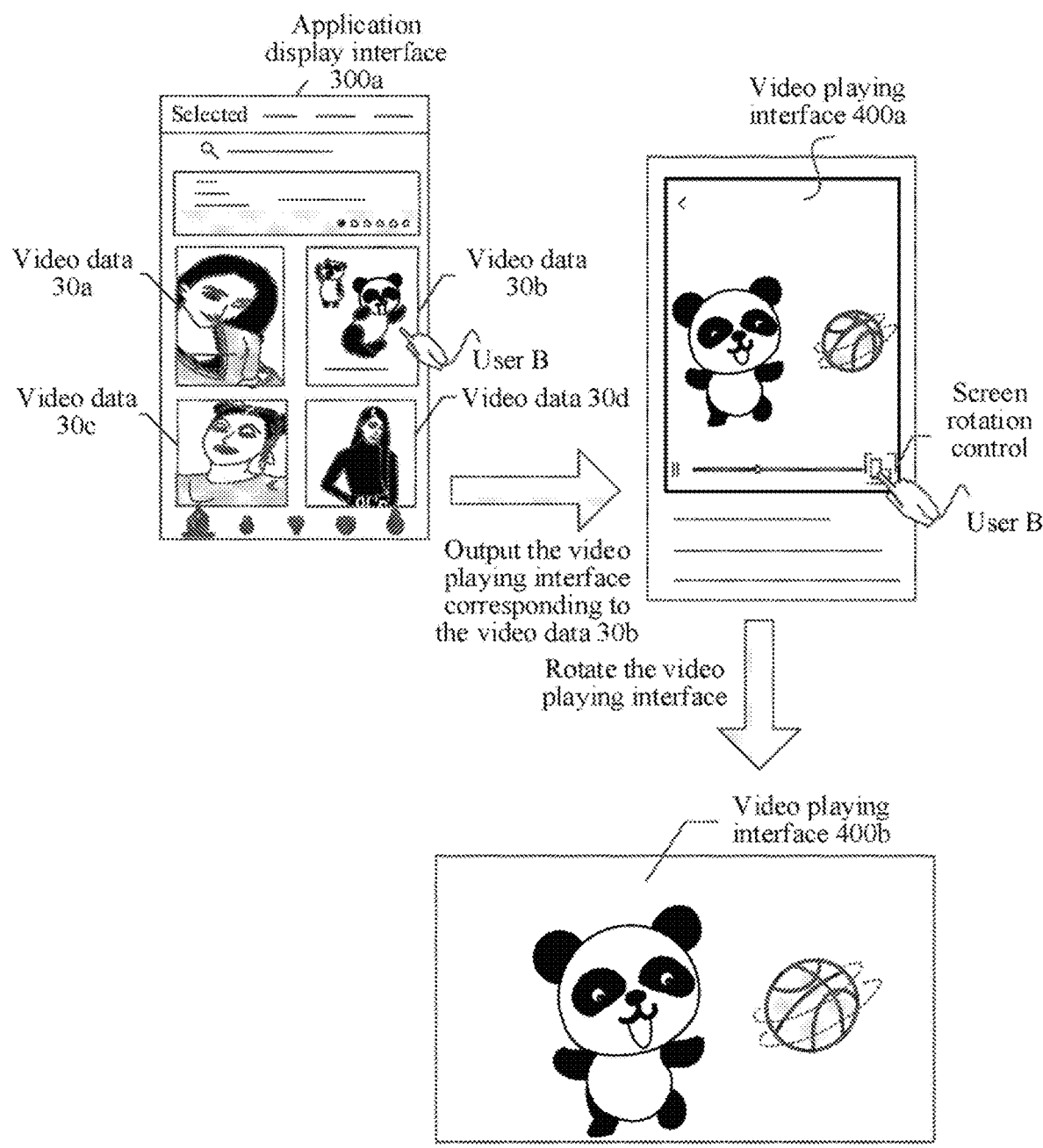
FIG. 4 is a schematic diagram of a scenario of an application display interface according to an embodiment of this application.

For ease of understanding, further, FIG. 4 is a schematic diagram of a scenario of an application display interface according to an embodiment of this application. An application display interface 300a shown in FIG. 4 may include a plurality of pieces of video data, where the plurality of pieces of video data may specifically include video data 30a, video data 30b, video data 30c, and video data 30d shown in FIG. 4. It may be understood that, in this embodiment of this application, the video data 30a, the video data 30b, the video data 30c, and the video data 30d presented in the application display interface 300a may be collectively referred to as recommended video data.

As shown in FIG. 4, when a user B needs to play a piece of recommended video data (for example, the video data 30b), the video data 30b selected by the user B from the application display interface 300a may be collectively referred to as video data in the application display interface. In this case, the user terminal may display, in response to a playing operation for video data in the application display interface, a video playing interface corresponding to the video data. For example, as shown in FIG. 4, a video playing interface corresponding to the video data 30b may be displayed in the user terminal, and the video playing interface corresponding to the video data 30b may be a video playing interface 400a shown in FIG. 4. In this case, a touchscreen corresponding to the video playing interface 400a of the user terminal is in a first state (for example, portrait state).

It is to be understood that, the video data 30b may be the target video data in the foregoing embodiment corresponding to FIG. 2, that is, a video program corresponding to the video data 30b may be the foregoing video program that is shown in FIG. 2 and whose program name is "BBCC". It may be understood that, as shown in FIG. 4, when the user B needs to switch the screen state of the touchscreen of the user terminal from the first state to a second state (for example, landscape state), to obtain a video playing interface 400b shown in FIG. 4, the user B may perform a click operation (for example, single-click operation) for any arbitrary position on the video playing interface 400a shown in FIG. 4, to display a screen rotation control shown in FIG. 4 in the video playing interface 400a. In this case, as shown in FIG. 4, the user terminal may rotate, in response to a trigger operation performed by the user B for the screen rotation control, the video playing interface currently in the first state (for example, the video playing interface 400a shown in FIG. 4), to switch the video playing interface of the video client from the video playing interface 400a shown in FIG. 4 to the video playing interface 400b shown in FIG. 4, to enhance the visual display effect of the user during playing of the foregoing video data 30b.

It may be understood that, the video playing interface 400a and the video playing interface 400b shown in FIG. 4 may be video playing interfaces of the touchscreen of the user terminal in different screen states. In some embodiments, the user B may alternatively directly switch, in a case that it is unnecessary to click the screen rotation control with a single hand, the screen state of the touchscreen of the user terminal from the first state (for example, portrait state) to the second state (for example, landscape state) by rotating the touchscreen.

Figure 5:
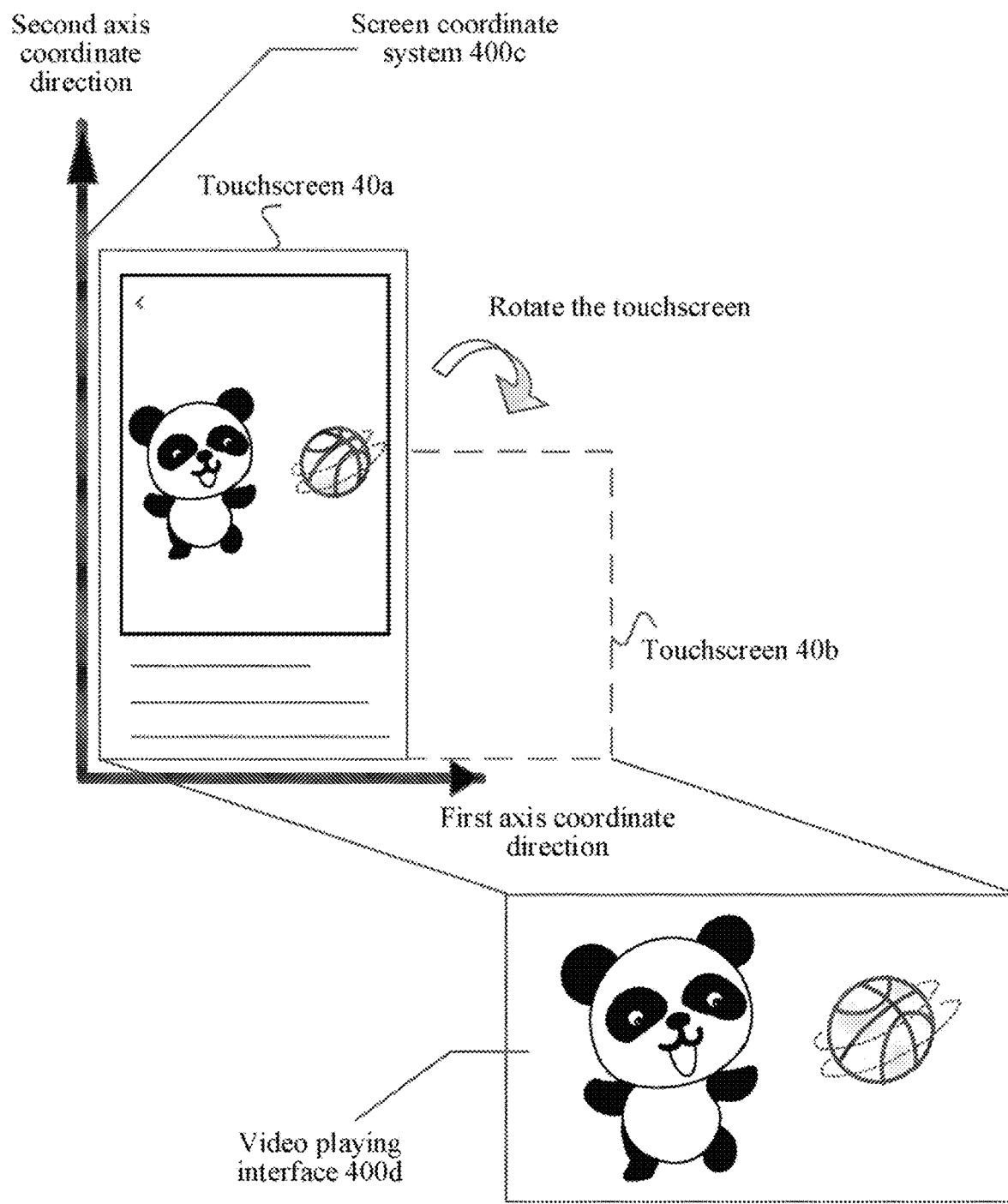
FIG. 5 is a schematic diagram of a scenario of rotating a touchscreen according to an embodiment of this application.

For ease of understanding, further, FIG. 5 is a schematic diagram of a scenario of rotating a touchscreen according to an embodiment of this application. As shown in FIG. 5, a user (for example, the foregoing user B) may perform a rotation operation for a touchscreen 40a in the first state (for example, portrait state) shown in FIG. 5. In this case, when detecting the rotation operation for the touchscreen, the user terminal may rotate the touchscreen (a rotation direction may be a direction indicated by a rotation arrow shown in FIG. 5), and a touchscreen in the second state obtained after rotation may be a touchscreen 40b shown in FIG. 5. It may be understood that, in this embodiment of this application, a video playing interface 400d shown in FIG. 5 may be displayed on the touchscreen 40b shown in FIG. 5 under a screen coordinate system corresponding to the touchscreen (for example, screen coordinate system 400c shown in FIG. 5), and then a manner used for switching the video playing interface may be flexibly selected according to an actual requirement. For example, in a case that the touchscreen is relatively large, and it is not convenient to directly rotate the touchscreen, the video playing interface may be switched by triggering the screen rotation control, to switch the screen state. On the contrary, the video playing interface may be switched by rotating the touchscreen, to switch the screen state.

It may be understood that, the screen coordinate system 400c shown in FIG. 5 may be a global coordinate system. In this case, relative to any user (for example, user B) operating the user terminal, a first axis coordinate direction (for example, X-axis) and a second axis coordinate direction (for example, Y-axis) under the global coordinate system are relatively fixed and unchanged. Therefore, when the user B switches the screen state of the touchscreen of the user terminal from the first state to the second state, each of a progress control direction of a progress bar subsequently displayed in the video playing interface on the touchscreen 40a and a progress control direction of a progress bar displayed in the video playing interface on the touchscreen 40b may be the first axis coordinate direction (for example, X-axis) shown in FIG. 5. This means that the progress control direction in this embodiment of this application is determined by the first axis coordinate direction under the foregoing screen coordinate system 400c, that is, the first axis coordinate direction may be used as an auxiliary reference direction in this embodiment of this application. In this way, the user terminal may determine a progress control direction of a progress bar in the video playing interface based on the auxiliary reference direction.

For ease of understanding, in this embodiment of this application, using an example in which the screen state of the touchscreen (for example, the terminal screen of the user terminal) is the landscape state (that is, the foregoing second state), a specific process in which the user terminal recognizes the operation gesture corresponding to the slide operation based on the foregoing slide associated parameter is described. It may be understood that, the slide associated parameter may specifically include a touch point set formed by N screen touch points; the N screen touch points are captured in a case that a user presses a touchscreen corresponding to the video playing interface; and N is a positive integer. In this case, the user terminal may obtain the N screen touch points from the touch point set corresponding to the slide associated parameter, and may determine, based on the N screen touch points and position information of the N screen touch points on the touchscreen, a slide trajectory formed by the N screen touch points. Further, the user terminal may invoke a system gesture library corresponding to the application client, and determine, in a case that a trajectory matching the slide trajectory is found by searching the system gesture library, that the operation gesture corresponding to the slide operation belongs to the first gesture type.

Figure 6:
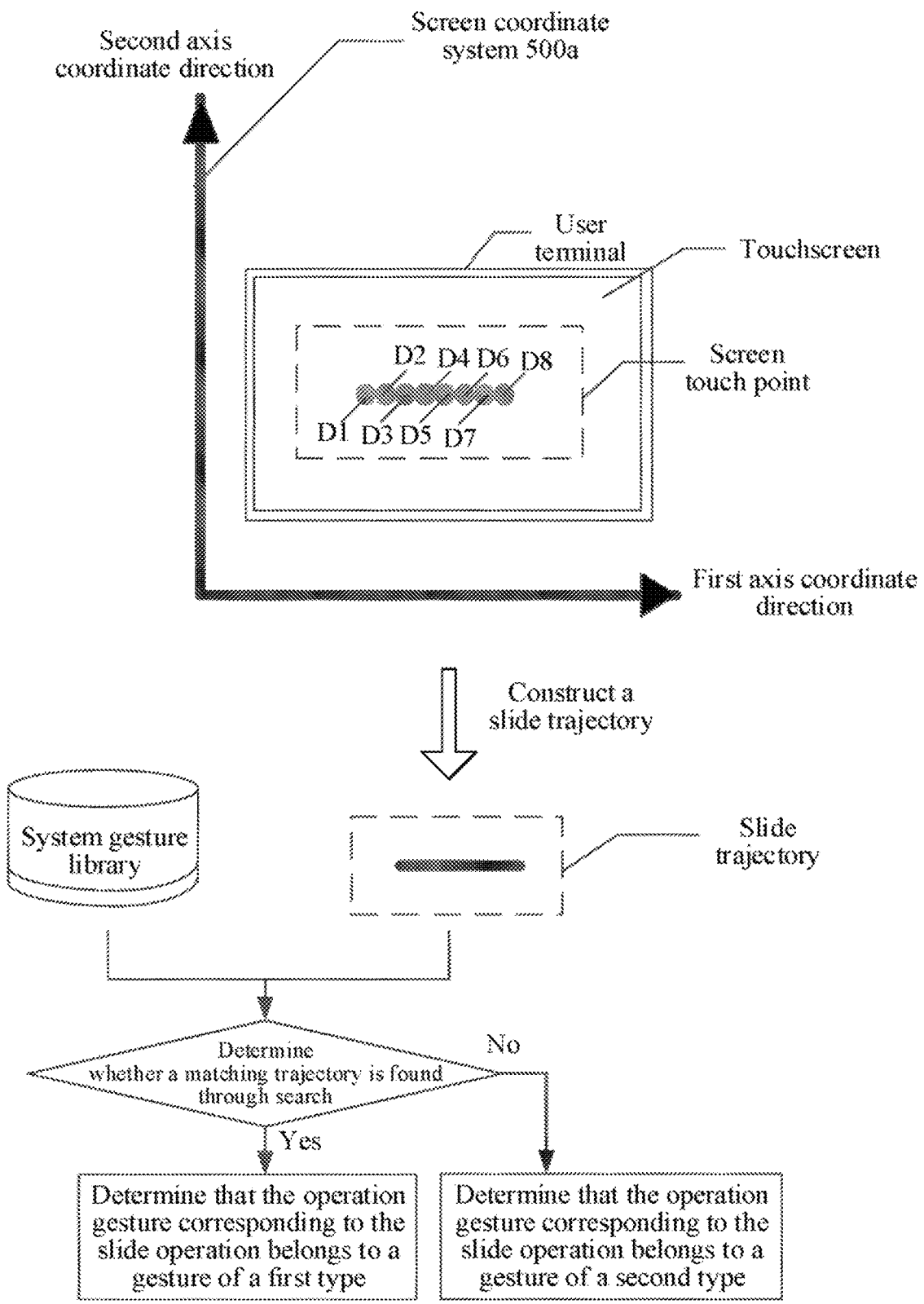
FIG. 6 is a schematic diagram of a scenario of a slide trajectory according to an embodiment of this application.

For ease of understanding, further, FIG. 6 is a schematic diagram of a scenario of a slide trajectory according to an embodiment of this application. Under a screen coordinate system 500a shown in FIG. 6, when a user presses a touchscreen of a user terminal shown in FIG. 6, the user terminal may capture, through a screen capture technology, all screen touch points obtained when the user (for example, the user B in the foregoing embodiment corresponding to FIG. 5) presses the touchscreen corresponding to the foregoing video playing interface. For example, as shown in FIG. 6, the user terminal may obtain N screen touch points. For ease of understanding, in this embodiment of this application, N=8 is used as an example, and the eight screen touch points may specifically include a screen touch point D1, a screen touch point D2, a screen touch point D3, a screen touch point D4, a screen touch point D5, a screen touch point D6, a screen touch point D7, and a screen touch point D8 shown in FIG. 6.

It may be understood that, under the screen coordinate system 500a, the screen touch point D1, the screen touch point D2, the screen touch point D3, the screen touch point D4, the screen touch point D5, the screen touch point D6, the screen touch point D7, and the screen touch point D8 are screen touch points sequentially captured in chronological order. Therefore, the user terminal may add the screen touch point D1, the screen touch point D2, the screen touch point D3, the screen touch point D4, the screen touch point D5, the screen touch point D6, the screen touch point D7, and the screen touch point D8 respectively to a touch point set in chronological order, and then respective position information of the eight screen touch points in the touch point set on the touchscreen may be referred to as a slide associated parameter.

As shown in FIG. 6, further, the user terminal may obtain the eight (that is, N=8) screen touch points from the touch point set corresponding to the slide associated parameter, and then may construct, based on the eight screen touch points and the position information of the eight screen touch points on the touchscreen (that is, the position information of the eight screen touch points), a slide trajectory shown in FIG. 6.

It may be understood that, under the screen coordinate system 500a, the position information corresponding to the screen touch point D1 may be position information E1, the position information corresponding to the screen touch point D2 may be position information E2, and the position information corresponding to the screen touch point D3 may be position information E3. The rest can be deduced by analogy, and the position information corresponding to the screen touch point D8 may be position information E8. Specifically, refer to the following table 1, which is a mapping relationship table of position information of touch points provided in an embodiment of this application.

TABLE 1

| Mapping relationship table | | | | | | | | |
|---|---|---|---|---|---|---|---|---|
| Screen touch point | D1 | D2 | D3 | D4 | D5 | D6 | D7 | D8 |
| Position information | Position information E1 | Position information E2 | Position information E3 | Position information E4 | Position information E5 | Position information E6 | Position information E7 | Position information E8 |

The screen touch point D1, the screen touch point D2, the screen touch point D3, the screen touch point D4, the screen touch point D5, the screen touch point D6, the screen touch point D7, and the screen touch point D8 shown in the foregoing table 1 may be the eight screen touch points in the foregoing embodiment corresponding to FIG. 6. It may be understood that, as shown in FIG. 6, when obtaining the eight screen touch points and the position information of the eight screen touch points on the touchscreen (for example, the position information E1, the position information E2, the position information E3, the position information E4, the position information E5, the position information E6, the position information E7, and the position information E8 shown in the foregoing table 1), the user terminal may construct the foregoing slide trajectory shown in FIG. 6. As shown in FIG. 6, in this case, the user terminal may invoke a system gesture library corresponding to the application client (for example, the foregoing video client) through an interface corresponding to the application client, to determine, in the system gesture library shown in FIG. 6, whether a trajectory matching the slide trajectory shown in FIG. 6 exists.

It may be understood that, when the user terminal finds a trajectory matching the slide trajectory shown in FIG. 6 by searching the system gesture library, it may be determined that a trajectory matching the slide trajectory shown in FIG. 6 exists in the system gesture library, and then it may be determined that the operation gesture corresponding to the foregoing slide operation belongs to the first gesture type (for example, the foregoing swipe gesture), so that the following step S102 may continue to be performed. It is to be understood that, in this embodiment of this application, when performing a slide operation at any position on the touchscreen of the user terminal, the user may recognize an operation gesture corresponding to the slide operation based on the foregoing screen capture technology, and then may start, when recognizing that the operation gesture belongs to the swipe gesture, the foregoing playing progress control function precise to seconds, thereby subsequently improving precision of performing playing progress control on the video data.

In some embodiments, as shown in FIG. 6, when the user terminal finds no trajectory matching the slide trajectory shown in FIG. 6 by searching the system gesture library, it may be determined that no trajectory matching the slide trajectory shown in FIG. 6 exists in the system gesture library, and then it may be determined that the operation gesture corresponding to the foregoing slide operation belongs to the second gesture type (for example, the foregoing drag gesture). Therefore, a progress drag function of the progress bar corresponding to the video data (for example, the foregoing video data 30*b*) may be started in the user terminal, so that a time progress adjustment rule used for adjusting the progress bar may be determined according to the progress drag function, and then the progress bar of the video data may be displayed on the video playing interface based on the time progress adjustment rule, to make it convenient to subsequently perform time progress processing on the progress bar, thereby enabling the adjusted progress bar to accurately conform to a drag intention of the user.

Figure 7:
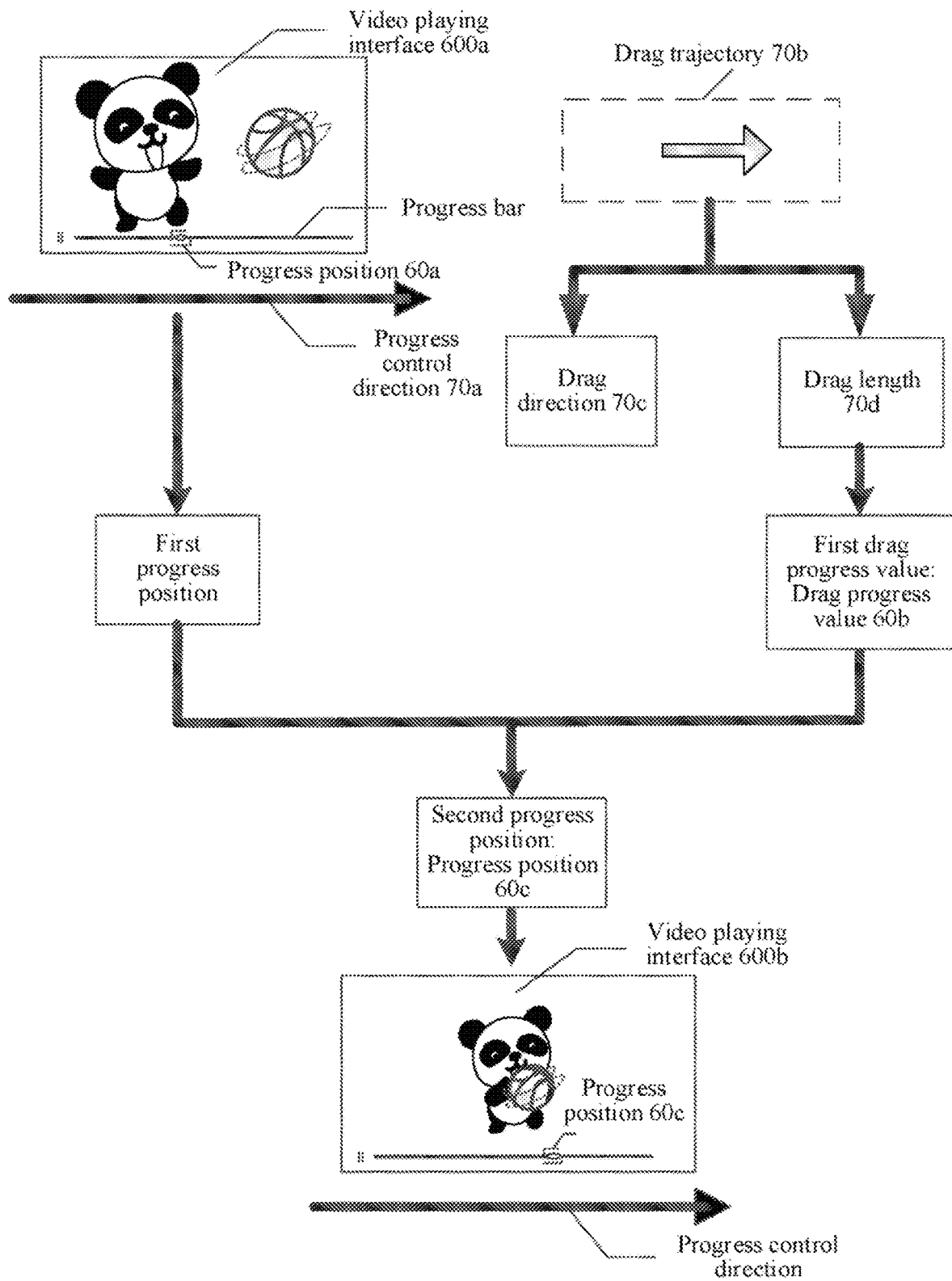
FIG. 7 is a schematic diagram of a scenario of controlling a progress position of a progress bar according to an embodiment of this application.

For ease of understanding, further, FIG. 7 is a schematic diagram of a scenario of controlling a progress position of a progress bar according to an embodiment of this application. As shown in FIG. 7, when recognizing, based on the screen capture technology in the foregoing embodiment corresponding to FIG. 6, that the operation gesture corresponding to the slide operation belongs to the second gesture type, the user terminal may instruct the application client (for example, the foregoing video client) run on the user terminal to start the foregoing progress drag function. It is to be understood that, in this case, the user terminal may determine a time progress adjustment rule of a currently used player based on the progress drag function, and then display, based on the time progress adjustment rule, the progress bar of the video data (for example, the foregoing video data 30*b*) on a video playing interface 600*a* shown in FIG. 7. As shown in FIG. 7, in this embodiment of this application, a progress position at which the user performs a slide operation in the video playing interface 600*a* (for example, a progress position 60*a* located on the progress bar and shown in FIG. 7) may be collectively referred to as the first progress position. It may be understood that, the progress bar involved in this application may be used for reflecting the playing progress of the video data (for example, the foregoing video data 30*b*). For example, the progress position 60*a* on the progress bar may be a playing progress whose current moment is a moment T1. It may be understood that, in this embodiment of this application, a moment at which the foregoing slide operation (for example, a drag operation corresponding to a drag trajectory 70*b* shown in FIG. 7) is performed may be collectively referred to as the moment T1.

It may be understood that, after the user terminal recognizes that the operation gesture corresponding to the slide operation performed by the user in the video playing interface 600*a* belongs to the second gesture type (for example, the foregoing drag gesture), all slide operations corresponding to the second gesture type may be further collectively referred to as the drag operation. In this case, the user terminal may determine, on the progress bar displayed in the video playing interface 600*a* shown in FIG. 7, the first progress position corresponding to the drag operation, that is, the progress position 60*a* shown in FIG. 7.

Further, as shown in FIG. 7, the user terminal may determine, based on a drag trajectory corresponding to the drag operation such as the drag trajectory 70*b* shown in FIG. 7, a drag direction (for example, drag direction 70*c* shown in FIG. 7) and a drag length (for example, drag length 70*d* shown in FIG. 7) of the drag trajectory 70*b*. It may be understood that, further, the user terminal may perform, based on the first progress position (for example, progress position 60*a*), the drag direction (for example, drag direction 70*c*), and the drag length (for example, drag length 70*d*), time progress processing on the progress bar of the video data shown in FIG. 7. For example, as shown in FIG. 7, when the drag direction 70*c* is the same as the progress control direction 70*a* shown in FIG. 7, the user terminal may adjust, based on a first drag progress value to which the drag length 70*d* is mapped (for example, drag progress value 60*b* shown in FIG. 7), the progress bar of the video data from the first progress position (for example, progress position 60*a* shown in FIG. 7) to a second progress position, where the second progress position may be a progress position 60*c* shown in FIG. 7; and may display, on the video playing interface 600*b* shown in FIG. 7, a progress bar whose progress position is the progress position 60*c*. It is to be understood that, the progress bar whose progress position is the progress position 60*c* is a progress bar obtained after the user terminal adjusts the progress bar in the video playing interface 600*a* according to the foregoing time progress adjustment rule.

It may be understood that, as shown in FIG. 7, when the user terminal determines that the drag direction 70*c* is the same as the progress control direction 70*a* of the progress bar, it may be determined that the second progress position is greater than the foregoing first progress position, and a progress difference between the second progress position and the first progress position may be the first drag progress value shown in FIG. 7.

It is to be understood that, in some embodiments, if the user terminal determines that the drag direction corresponding to the foregoing drag operation is opposite to the progress control direction of the progress bar, the user terminal may further adjust the progress bar of the video data from the first progress position to a third progress position based on a second drag progress value to which the drag length is mapped. In this case, the third progress position may be less than the first progress position, and a progress difference between the first progress position and the third progress position may be the second drag progress value.

It is to be understood that, in this embodiment of this application, the operation gesture corresponding to the slide operation is recognized by invoking the system gesture library through the foregoing interface. In addition, in some embodiments, to further enhance precision of performing playing progress control on the video data, in this embodiment of this application, the operation gesture corresponding to the slide operation may be further recognized by collecting statistics on the press duration. Therefore, the slide associated parameter in this embodiment of this application may further include a press duration corresponding to the foregoing N screen touch points. It may be understood that, in this embodiment of this application, the press duration is obtained by the user terminal through statistics in a case that the foregoing user presses a touchscreen corresponding to the video playing interface. In this case, a specific process in which the user terminal recognizes, based on the slide associated parameter, an operation gesture corresponding to the slide operation may be described as follows: The user terminal may determine, based on the press duration in the slide associated parameter, a duration threshold corresponding to the press duration, and then may compare the press duration with the duration threshold, to obtain a comparison result. Further, the user terminal may determine, in a case that the comparison result indicates that the press duration is less than the duration threshold, that the operation gesture corresponding to the slide operation belongs to the first gesture type, to make it convenient to subsequently continue to perform the following step S102. In some embodiments, the user terminal may further determine, in a case that the comparison result indicates that the press duration is greater than or equal to the duration threshold, that the operation gesture corresponding to the slide operation belongs to a second gesture type, to make it convenient to subsequently start the progress drag function corresponding to the foregoing progress bar based on the second gesture type. It is to be understood that, in this case, for the specific process in which the user terminal starts the progress drag function based on the second gesture type, reference may be made to the description of the specific process of performing progress control on the progress bar in the foregoing embodiment corresponding to FIG. 7, and details do not continue to be described herein.

In some implementations, the press duration is obtained by the user terminal through statistics when the foregoing user presses a touchscreen corresponding to the video playing interface. For example but not limited to, the statistics may include summation, wherein the press duration is obtained by adding each press duration of the each screen touch point in the N screen touch points.

Step S102. Obtaining, in a case of recognizing that the operation gesture belongs to a first gesture type, a start trigger position and an end trigger position of the slide operation from a slide trajectory corresponding to the first gesture type.

In some implementations, step S102 may include determining, by the device according to the slide operation, whether the operation gesture belongs to a first gesture type, wherein the first gesture type is used for adjusting a playing progress of the video data by a preset progress duration; and/or in response to determining that the operation gesture belongs to the first gesture type, obtaining, by the device, a start trigger position and an end trigger position of the slide operation from a slide trajectory of the slide operation.

Specifically, after completing the foregoing step S102, the user terminal may recognize that the foregoing operation gesture belongs to the first gesture type (that is, swipe gesture). In this case, the user terminal may start the foregoing playing progress control function precise to seconds, then may obtain, based on the playing progress control function, a start trigger position (for example, the screen touch point D1 in the foregoing embodiment corresponding to FIG. 6) and an end trigger position (for example, the screen touch point D8 in the foregoing embodiment corresponding to FIG. 6) of the slide operation from a slide trajectory corresponding to the first gesture type, and then may continue to perform the following step S103. It may be understood that, both the start trigger position and the end trigger position are position information of screen touch points under a screen coordinate system corresponding to a touchscreen; and the touchscreen may be used for displaying the video playing interface corresponding to the video data.

Step S103. Determine, based on the start trigger position and the end trigger position, a slide direction indicated by the slide trajectory, adjust, based on the slide direction and a progress control direction of a progress bar in the video playing interface, a playing progress of the video data by a preset progress duration, and display, on the video playing interface, playing-progress-adjusted video data.

Specifically, in a case that the touchscreen corresponding to the video playing interface is in a landscape state, the user terminal may determine a first shaft coordinate direction under the screen coordinate system as an auxiliary reference direction, and may determine the progress control direction of the progress bar in the video playing interface based on the auxiliary reference direction. Further, the user terminal may determine a position information difference between the start trigger position and the end trigger position, may determine a difference attribute of the position information difference in the auxiliary reference direction, and then may determine, based on the difference attribute, the slide direction indicated by the slide trajectory. Further, the user terminal may use a video frame corresponding to the start trigger position of the slide operation as a transitional video frame, and may use a playing time stamp of the transitional video frame as an initial time stamp. Further, the user terminal may control the playing progress of the video data based on the initial time stamp, the preset progress duration, the slide direction, and the progress control direction, and display, on the video playing interface, the playing-progress-adjusted video data.

It may be understood that, in a case that the slide direction is the same as the progress control direction, the user terminal may determine a preset progress duration (for example, the foregoing 5 seconds) as a fast-forwarding duration in the slide direction, that is, the user terminal may control the player to fast-forward by 5 seconds along the progress control direction. Further, the user terminal may determine, based on the initial time stamp and the fast-forwarding duration, a first target time stamp corresponding to the video data. Further, in a case that a cached data frame corresponding to the first target time stamp and a cached video sequence corresponding to the cached data frame are found by searching a cached database corresponding to the video data, the user terminal may fast-forward a video frame of the video data from the transitional video frame to the cached data frame; and may use the cached video sequence corresponding to the cached data frame as the playing-progress-controlled video data, and display the playing-progress-controlled video data on the video playing interface. It is to be understood that, the cached data frame may be a first video frame of the cached video sequence.

Figure 8:
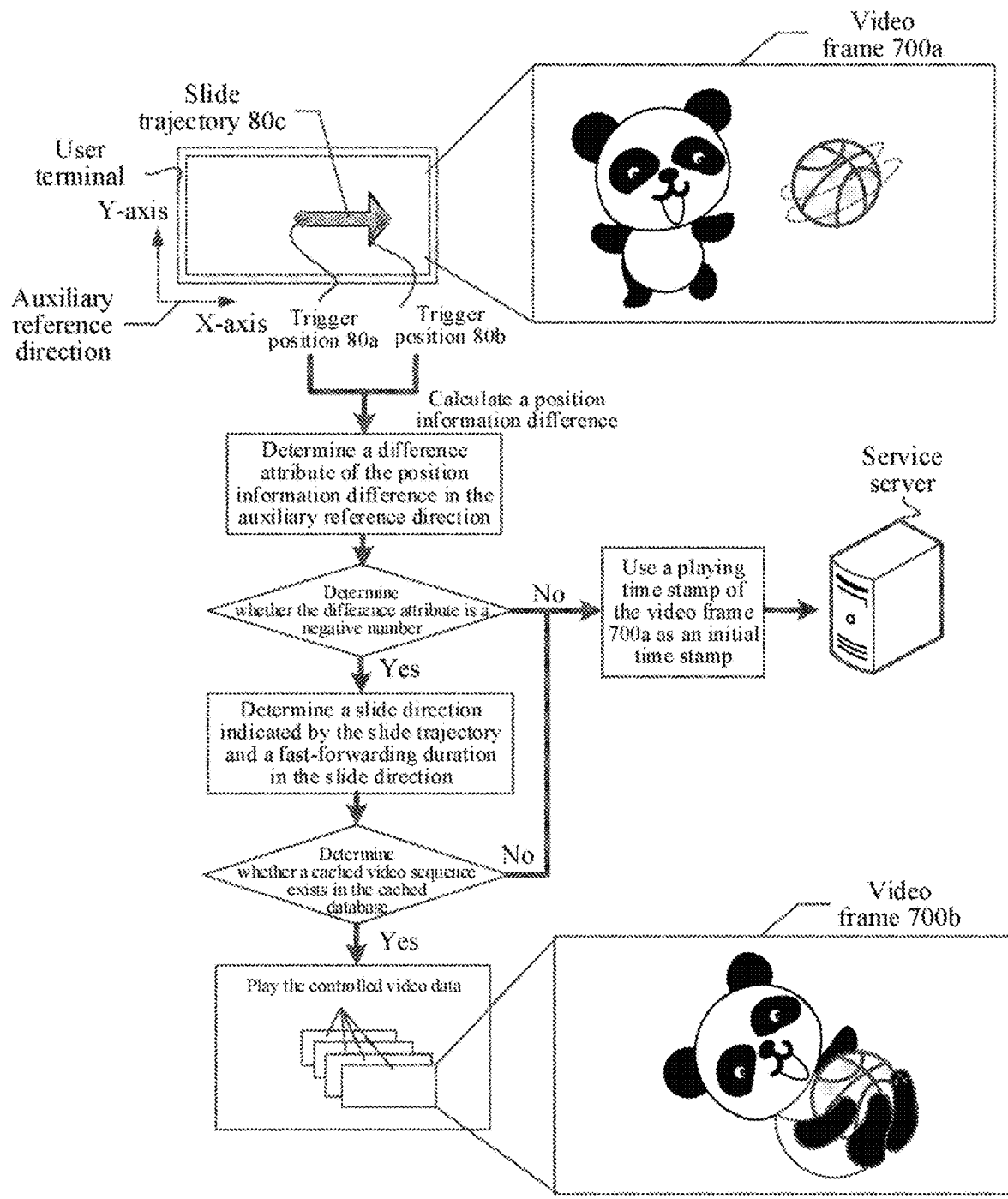
FIG. 8 is a schematic diagram of a scenario of adjusting a playing progress of video data according to an embodiment of this application.

For ease of understanding, further, FIG. 8 is a schematic diagram of a scenario of controlling a playing progress of video data according to an embodiment of this application. A slide trajectory 80c shown in FIG. 8 may be a trajectory that matches a slide trajectory of a slide operation and that is found by a user terminal by searching a system gesture library. In this case, an operation gesture corresponding to the slide operation may be the foregoing first gesture type (for example, swipe gesture). It may be understood that, the slide operation may be performed on a video playing interface corresponding to a video frame 700a shown in FIG. 8.

The slide trajectory 80c shown in FIG. 8 may be formed by N screen touch points, where N may be a positive integer. The N screen touch points may specifically include a screen trigger point 1 and a screen trigger point N. Position information corresponding to the screen trigger point 1 may be a trigger position 80a shown in FIG. 8, that is, the trigger position 80a may be position information of the screen trigger point 1 (that is, first screen trigger point) captured by the user terminal when a finger of a user touches a touchscreen of the user terminal shown in FIG. 8. Similarly, position information corresponding to the screen trigger point N may be a trigger position 80b shown in FIG. 8, that is, the trigger position 80b may be position information of the screen trigger point N (that is, last screen trigger point) captured by the user terminal when the finger of the user leaves the touchscreen of the user terminal shown in FIG. 8. It may be understood that, in this embodiment of this application, in the process of performing the slide operation, the position information of the first screen trigger point may be collectively referred to as the start trigger position, and the position information of the last screen trigger point may be collectively referred to as the end trigger position.

It is to be understood that, the position information of the screen trigger point 1 and the screen trigger point N on the touchscreen is determined by a screen coordinate system shown in FIG. 8. The screen coordinate system may be a rectangular coordinate system. For example, a first axis coordinate direction under the rectangular coordinate system may be an X-axis shown in FIG. 8, and a second axis coordinate direction under the rectangular coordinate system may be a Y-axis shown in FIG. 8. As shown in FIG. 8, n this embodiment of this application, when the screen state of the touchscreen corresponding to the video playing interface (that is, the video playing interface corresponding to the video frame 700a shown in FIG. 8) is in the landscape state, the first axis coordinate direction (that is, X-axis direction shown in FIG. 8) under the screen coordinate system (that is, the foregoing rectangular coordinate system) may be further determined as an auxiliary reference direction, and then a progress control direction of a progress bar in the video playing interface may be determined based on the auxiliary reference direction. It may be understood that, in this case, the progress bar and the progress control direction of the progress bar may not need to be presented on the video playing interface. That is, in this embodiment of this application, the trigger position 80a (that is, the foregoing start trigger position) and the trigger position 80b (that is, the foregoing end trigger position) shown in FIG. 8 may be directly obtained, based on the foregoing recognized first gesture type (for example, swipe gesture), from a slide trajectory corresponding to the swipe gesture (that is, the slide trajectory 80c shown in FIG. 8).

As shown in FIG. 8, the user terminal may determine, based on the trigger position 80a and the trigger position 80b, a position information difference between the start trigger position and the end trigger position (that is, slide length of the slide trajectory 80c shown in FIG. 8). In this embodiment of this application, the information position difference may be a coordinate value (for example, X1) of the trigger position 80a minus a coordinate value (for example, X2) of the trigger position 80b under the screen coordinate system, and then based on a position information difference between X1 and X2 (for example, X1−X2=X12), a difference attribute of the position information difference in the auxiliary reference direction shown in FIG. 8 may be determined, so that a slide direction indicated by the slide trajectory 80c shown in FIG. 8 may be further determined based on the difference attribute.

It may be understood that, the difference attribute may specifically include that the position information difference (that is, X12) is a negative number or the position information difference (that is, X12) is a positive number. For example, as shown in FIG. 8, when the X-axis direction under the foregoing screen coordinate system is used as the auxiliary reference direction, and the user slides from left to right on the touchscreen of the user terminal shown in FIG. 8, the user terminal may determine, based on the foregoing screen capture technology, that the difference (that is, X12) of the position information is a negative number. That is, in this case, the user terminal may determine, when determining that the coordinate value X1 is less than the coordinate value X2, that the difference attribute is a negative number, then may determine, when the difference attribute is a negative number, that the slide direction indicated by the slide trajectory 80c is rightward slide, and then may determine a progress duration (for example, T=5 seconds) of the current rightward slide, so that the user terminal may still intelligently trigger, based on the slide direction corresponding to the foregoing swipe gesture, a function of controlling the playing progress of the currently played video data without displaying the progress bar. In this case, the slide direction is the same as the progress control direction in FIG. 8, and then the foregoing progress duration may be determined as the fast-forwarding duration in the slide direction, to cause the currently played video frame (for example, the video frame 700a shown in FIG. 8) to jump to a video frame after 5 seconds (for example, a video frame 700b shown in FIG. 8), to implement fast-forwarding playing precise to seconds during playing of the video data.

It may be understood that, during playing of the video data, before the playing-progress-controlled video data is displayed, the application client run on the user terminal searches the user terminal locally in advance to determine whether a cached video sequence (for example, cached video sequence 1) associated with the progress duration (for example, the foregoing 5 seconds) exists, and the cached video sequence may be a video sequence in which the video frame 700b shown in FIG. 8 is the first video frame. As shown in FIG. 8, when the user terminal determines that the cached video sequence (for example, cached video sequence 1) exists in the cached database, the video frame of the video data may be fast-forwarded from the video frame 700a shown in FIG. 8 (in this embodiment of this application, the currently played video frame 700a may be collectively referred to as a transitional video frame) to the video frame 700b shown in FIG. 8 (that is, cached data frame), a cached video sequence corresponding to the cached data frame is used as playing-progress-controlled video data, and the playing-progress-controlled video data is displayed on the video playing interface.

It may be understood that, in this embodiment of this application, a video frame (for example, the video frame 700a shown in FIG. 8) corresponding to the initial trigger position of the first gesture type (that is, the foregoing swipe gesture) may be collectively referred to as a transitional video frame, and then a playing time stamp of the transitional video frame played at the current moment (for example, the foregoing moment T1) may be used as an initial time stamp. In this way, after determining a progress duration (for example, the foregoing fast-forwarding duration) based on the foregoing slide direction, the user terminal may quickly determine, based on the initial time stamp and the fast-forwarding duration, a playing time stamp of a video frame that needs to be played at a next moment (for example, the foregoing moment T2), where the playing time stamp is collectively referred to as the first target time stamp. For ease of understanding, in this embodiment of this application, the video frame corresponding to the first target time stamp found by searching the cached database may be collectively referred to as a cached data frame. For example, the cached data frame may be the video frame 700b in FIG. 8. The cached data frame (for example, the video frame 700b shown in FIG. 8) may be the first video frame of the foregoing cached video sequence 1. Therefore, when fast-forwarding a video frame of the video data from the transitional video frame to the cached data frame, the user terminal may further use the cached video sequence corresponding to the cached data frame as the playing-progress-controlled video data, and display the playing-progress-controlled video data on the video playing interface of the user terminal.

It may be understood that, during playing of the video data, the user terminal may further synchronously transmit a video data loading request (for example, loading request 1) to the service server corresponding to the user terminal. In this way, when receiving a video sequence returned by the service server based on the video data loading request (for example, loading request 1), the user terminal may store the returned video sequence in the cached database as a cached video sequence (for example, the foregoing cached video sequence 1), and then may ensure video playing fluency during playing of the video data.

In some embodiments, as shown in FIG. 8, the user terminal may transmit, in a case that no cached data frame corresponding to the foregoing first target time stamp is found by the user terminal by searching the local cached database corresponding to the video data, the initial time stamp shown in FIG. 8 and the fast-forwarding duration to a service server shown in FIG. 8, to enable the service server to obtain, based on the initial time stamp, a first video sequence associated with the fast-forwarding duration (for example, 5 seconds) shown in FIG. 8. It may be understood that, in this embodiment of this application, in a case that the user terminal detects that the foregoing cached video sequence does not exist in the cached database, the video sequence directly obtained from the service server may be collectively referred to as the first video sequence. In this case, the first video sequence may include a target data frame corresponding to the foregoing first target time stamp, the target data frame may be the video frame 700b shown in FIG. 8, and the target data frame may be the first video frame of the first video sequence. It may be understood that, when receiving the first video sequence returned by the server, the user terminal may fast-forward the video frame of the video data from the foregoing transitional video frame (for example, video frame 700a) to the target data frame, and then may use, based on the first target time stamp corresponding to the target data frame, the first video sequence as new playing-progress-adjusted video data.

In some embodiments, it may be understood that, after obtaining the foregoing first video sequence, the user terminal may further add the first video sequence to the foregoing cached database, to subsequently use the first video sequence cached in the cached database as the foregoing cached video sequence, to ensure data playing coherence and fluency in the user terminal.

In this embodiment of this application, when obtaining a video playing interface corresponding to video data, a computer device (that is, the foregoing user terminal) in the embodiments of this application may recognize, in response to a slide operation performed for the video playing interface, an operation gesture corresponding to the slide operation. It may be understood that, in the embodiments of this application, a slide operation performed by a user for any position region in the video playing interface may be received, and a gesture corresponding to the received slide operation may be further recognized. It is to be understood that, the operation gesture herein may be determined by a trajectory corresponding to the slide operation. The operation gesture may be approximately classified into a first gesture type and a second gesture type. For example, the first gesture type herein may be a swipe gesture, and the swipe gesture may be used for triggering a function of precisely controlling a progress duration. In another example, the second gesture type herein may be a drag gesture, and the drag gesture may be used for triggering a function of controlling a progress of a progress bar. Therefore, further, the computer device may obtain, in a case of recognizing that the operation gesture belongs to the first gesture type (that is, the foregoing swipe gesture), a start trigger position and an end trigger position of the slide operation from a slide trajectory corresponding to the first gesture type, to determine, based on the start trigger position and the end trigger position, a slide direction indicated by the slide trajectory. Further, the computer device (for example, the user terminal) may control a playing progress of the video data based on the slide direction and a progress control direction of a progress bar in the video playing interface, for example, may fast-forward or rewind the video data precise to seconds, to display playing-progress-adjusted video data on the video playing interface. Therefore, it can be seen that, in the embodiments of this application, during playing of video data, a slide operation may be performed in any position region of a touchscreen, to start, in a case of recognizing that an operation gesture corresponding to the slide operation belongs to a first gesture type (for example, swipe gesture), a function of precisely controlling a progress duration, so that when a start trigger position and an end trigger position are obtained from a slide trajectory corresponding to the first gesture type subsequently, a slide direction indicated by the slide trajectory may be determined based on the start trigger position and the end trigger position, and then the playing progress may be accurately controlled based on the slide direction and the foregoing progress control direction, to ensure that playing precision of the video data can be accurately controlled.

Figure 9:
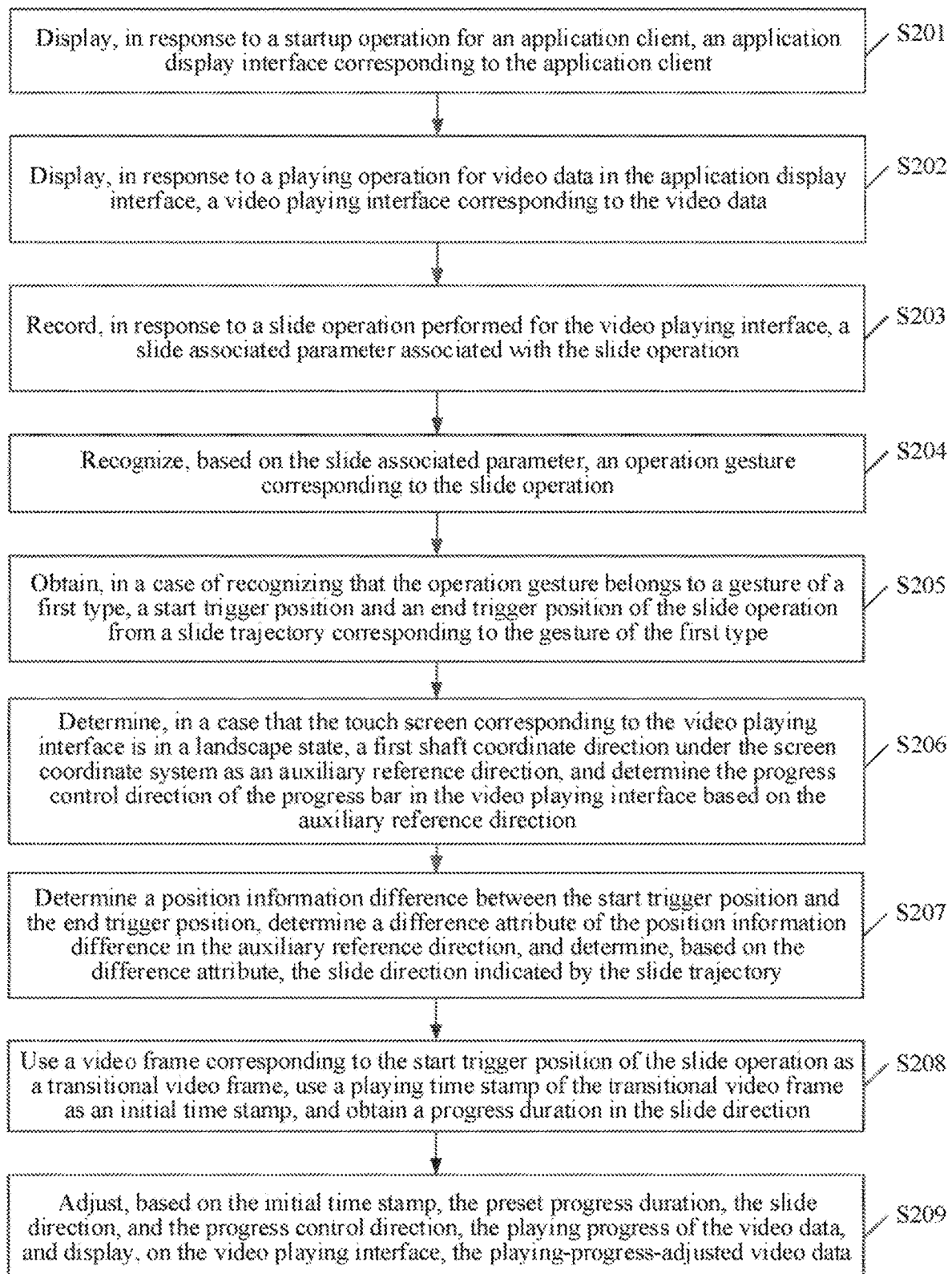
FIG. 9 is a schematic diagram of a video data processing method according to an embodiment of this application.

Further, FIG. 9 is a schematic diagram of a video data processing method according to an embodiment of this application. As shown in FIG. 9, the method may be performed by a user terminal (for example, the foregoing user terminal 10a shown in FIG. 2), may be performed by a service server (for example, the foregoing service server 20a shown in FIG. 2), or may be performed by a user terminal and a service server jointly. For ease of understanding, a description is made in this embodiment using an example in which the method is performed by a user terminal, the user terminal may be the foregoing target user terminal, and the method may specifically include the following steps:

Step S201. Display, in response to a startup operation for an application client, an application display interface corresponding to the application client.

Step S202. Display, in response to a playing operation for video data in the application display interface, a video playing interface corresponding to the video data.

Step S203. Record, in response to a slide operation performed for the video playing interface, a slide associated parameter associated with the slide operation.

It may be understood that, the slide associated parameter may include position information of N screen touch points; the N screen touch points are captured in a case that a user presses a touchscreen corresponding to the video playing interface; and N may be a positive integer. In some embodiments, the slide associated parameter may further include: a press duration corresponding to N screen touch points; and the press duration is obtained through statistics in a case that a user presses a touchscreen corresponding to the video playing interface. It may be understood that, for a specific implementation in which the user terminal records the slide associated parameter associated with the slide operation, reference may be made to the description for the slide associated parameter in the foregoing embodiment corresponding to FIG. 3, and details do not continue to be described herein.

Step S204. Recognize, based on the slide associated parameter, an operation gesture corresponding to the slide operation.

Specifically, the user terminal may obtain the position information of the N screen touch points from the slide associated parameter, and determine, based on the position information of the N screen touch points, a slide trajectory formed by the N screen touch points. Further, the user terminal may invoke a system gesture library corresponding to the application client, and determine, in a case that a trajectory matching the slide trajectory is found by searching the system gesture library, that the operation gesture corresponding to the slide operation belongs to the first gesture type, thereby further performing the following step S205. In some embodiments, it may be determined, in a case that no trajectory matching the slide trajectory is found by searching the system gesture library, that the operation gesture corresponding to the slide operation belongs to a second gesture type. It is to be understood that, the second gesture type may be used for instructing the application client to start a progress drag function of the progress bar corresponding to the video data, and then a progress position on the progress bar may be adaptively controlled based on the foregoing time progress adjustment rule in a case that the progress bar is displayed. For example, if the drag length is longer, the progress duration on the progress bar that needs to be controlled is longer, and then the progress position on the progress bar may be flexibly controlled.

In some embodiments, the user terminal may further determine, based on the press duration in the slide associated parameter, a duration threshold corresponding to the press duration. Further, the user terminal may compare the press duration with the duration threshold (for example, 3 seconds), to obtain a comparison result; and the user terminal may determine, in a case that the comparison result indicates that the press duration is less than the duration threshold, that the operation gesture corresponding to the slide operation belongs to the first gesture type (that is, the foregoing swipe gesture), thereby further performing the following step S205. In some embodiments, the user terminal may determine, in a case that the comparison result indicates that the press duration is greater than or equal to the duration threshold, that the operation gesture corresponding to the slide operation belongs to a second gesture type (that is, the foregoing drag gesture).

For a specific implementation in which the user terminal starts the foregoing progress drag function when recognizing that the foregoing operation gesture belongs to the second gesture type, reference may be made to the description of the specific process of controlling the progress position on the progress bar in the foregoing embodiment corresponding to FIG. 7, and details do not continue to be described herein.

Step S205. Obtain, in a case of recognizing that the operation gesture belongs to a first gesture type, a start trigger position and an end trigger position of the slide operation from a slide trajectory corresponding to the first gesture type.

Both the start trigger position and the end trigger position belong to position information of screen touch points under a screen coordinate system corresponding to a touchscreen; and the touchscreen may be used for displaying the video playing interface corresponding to the video data.

Step S206. Determine, in a case that the touchscreen corresponding to the video playing interface is in a landscape state, a first shaft coordinate direction under the screen coordinate system as an auxiliary reference direction, and determine the progress control direction of the progress bar in the video playing interface based on the auxiliary reference direction.

Step S207. Determine a position information difference between the start trigger position and the end trigger position, determine a difference attribute of the position information difference in the auxiliary reference direction, and determine, based on the difference attribute, the slide direction indicated by the slide trajectory.

Step S208. Use a video frame corresponding to the start trigger position of the slide operation as a transitional video frame, and use a playing time stamp of the transitional video frame as an initial time stamp.

Step S209. Adjust, based on the initial time stamp, the preset progress duration, the slide direction, and the progress control direction, the playing progress of the video data, and display, on the video playing interface, the playing-progress-adjusted video data.

Specifically, the user terminal may determine, in a case that the slide direction is the same as the progress control direction, the preset progress duration as a fast-forwarding duration in the slide direction. Further, the user terminal may determine, based on the initial time stamp and the fast-forwarding duration, a first target time stamp corresponding to the video data. Further, in a case that a cached data frame corresponding to the first target time stamp and a cached video sequence corresponding to the cached data frame are found by searching a cached database corresponding to the video data, the user terminal may fast-forward a video frame of the video data from the transitional video frame to the cached data frame; and use the cached video sequence corresponding to the cached data frame as the playing-progress-adjusted video data, and display the playing-progress-adjusted video data on the video playing interface; and the cached data frame is a first video frame of the cached video sequence.

For a specific implementation in which the user terminal searches the cached database for the cached video sequence, reference may be made to the description of the cached video sequence in the foregoing embodiment corresponding to FIG. 8, and details do not continue to be described herein. In some embodiments, the user terminal may transmit, in a case that no cached data frame corresponding to the first target time stamp is found by searching the cached database corresponding to the video data, the initial time stamp and the fast-forwarding duration to a service server, to enable the service server to obtain, based on the initial time stamp, a first video sequence associated with the fast-forwarding duration, where For a specific implementation in which the service server obtains the first video sequence, reference may be made to the description of the first video sequence in the foregoing embodiment corresponding to FIG. 8, and details do not continue to be described herein.

In some embodiments, the user terminal may determine, in a case that the slide direction is opposite to the progress control direction, the preset progress duration as a rewinding duration in the slide direction, and therefore may generate a video data loading request based on the initial time stamp and the rewinding duration. Further, the user terminal may transmit the video data loading request to a service server, to cause the service server to obtain, based on the initial time stamp, a second video sequence associated with the rewinding duration, where the second video sequence includes a key data frame corresponding to a second target time stamp and the transitional video frame corresponding to the initial time stamp; and the key data frame may be a first video frame of the second video sequence, and the second target time stamp may be determined by the initial time stamp and the rewinding duration. Further, when obtaining the second video sequence returned by the server, the user terminal may rewind the video frame of the video data from the transitional video frame to the key data frame; and then may use, based on the second target time stamp corresponding to the key data frame, the second video sequence as the playing-progress-adjusted video data, and display the playing-progress-adjusted video data on the video playing interface.

Figure 10:
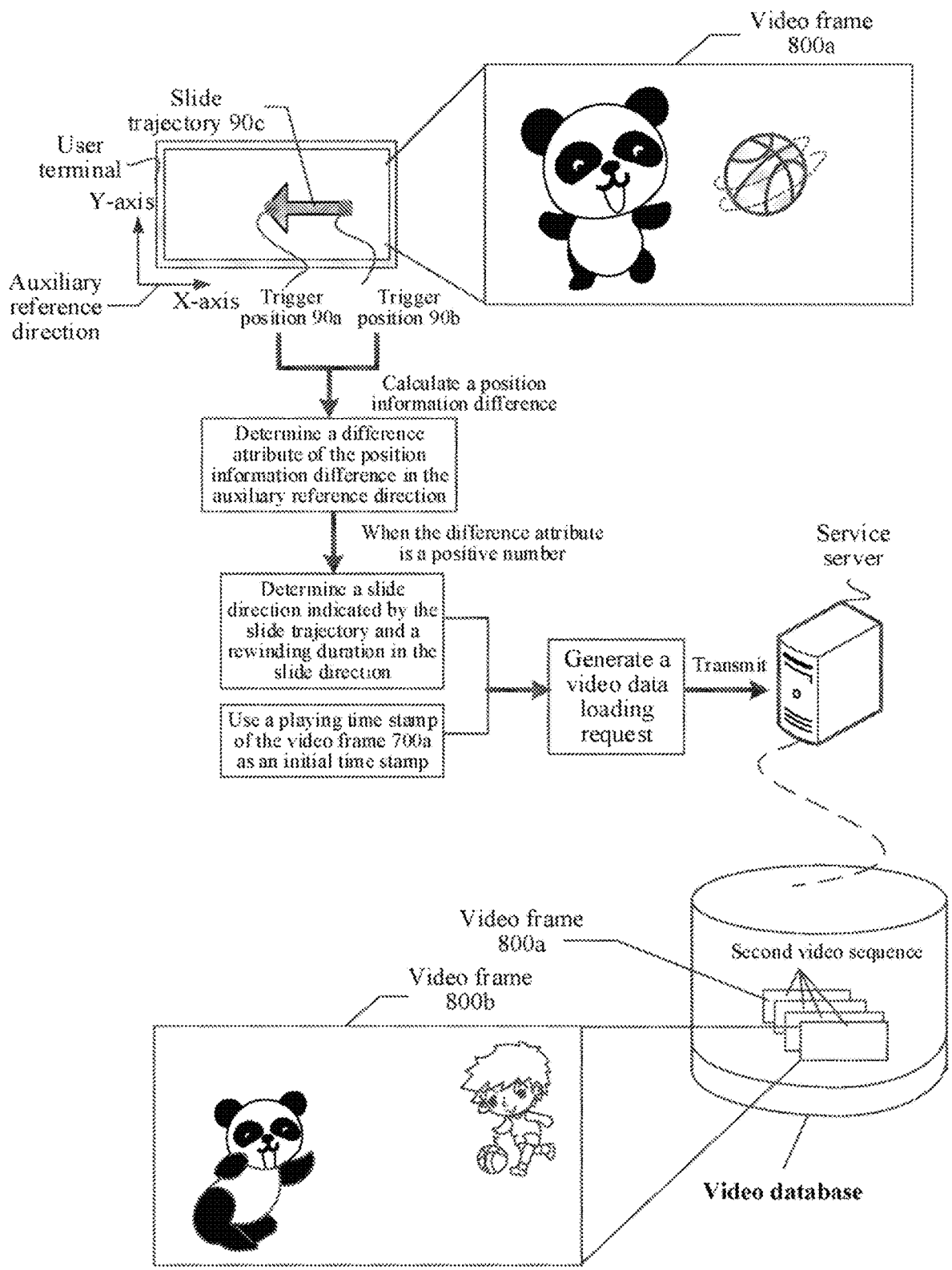
FIG. 10 is a schematic diagram of a scenario of obtaining a second video sequence according to an embodiment of this application.

For ease of understanding, further, FIG. 10 is a schematic diagram of a scenario of obtaining a second video sequence according to an embodiment of this application. A slide trajectory 90c shown in FIG. 10 may be a trajectory that matches a slide trajectory of a slide operation and that is found by a user terminal by searching a system gesture library. In this case, an operation gesture corresponding to the slide operation may be the foregoing first gesture type (for example, swipe gesture). It may be understood that, the slide operation may be performed on a video playing interface corresponding to a video frame 800a shown in FIG. 10.

The slide trajectory 90c shown in FIG. 10 may be formed by N screen touch points, where N may be a positive integer. The N screen touch points may specifically include a screen trigger point 1' and a screen trigger point N'. Position information corresponding to the screen trigger point 1' may be a trigger position 90b shown in FIG. 8, that is, the trigger position 90b may be position information of the screen trigger point 1' (that is, first screen trigger point) captured by the user terminal when a finger of a user touches a touchscreen of the user terminal shown in FIG. 10. Similarly, position information corresponding to the screen trigger point N' may be a trigger position 90a shown in FIG. 10, that is, the trigger position 90a may be position information of the screen trigger point N' (that is, last screen trigger point) captured by the user terminal when the finger of the user leaves the touchscreen of the user terminal shown in FIG. 10. Similarly, in this embodiment of this application, in the process of performing the slide operation, the position information of the first screen trigger point may be collectively referred to as the start trigger position, and the position information of the last screen trigger point may be collectively referred to as the end trigger position.

It is to be understood that, the position information of the screen trigger point 1' and the screen trigger point N' on the touchscreen is determined by a screen coordinate system shown in FIG. 10. The screen coordinate system may be a rectangular coordinate system. For example, a first axis coordinate direction under the rectangular coordinate system may be an X-axis shown in FIG. 10, and a second axis coordinate direction under the rectangular coordinate system may be a Y-axis shown in FIG. 10. As shown in FIG. 10, n this embodiment of this application, when the screen state of the touchscreen corresponding to the video playing interface (that is, the video playing interface corresponding to the video frame 800a shown in FIG. 10) is in the landscape state, the first axis coordinate direction (that is, X-axis direction shown in FIG. 10) under the screen coordinate system (that is, the foregoing rectangular coordinate system) may be further determined as an auxiliary reference direction, and then a progress control direction of a progress bar in the video playing interface may be determined based on the auxiliary reference direction. It may be understood that, in this case, in this embodiment of this application, the trigger position 90b (that is, the foregoing start trigger position) and the trigger position 90a (that is, the foregoing end trigger position) shown in FIG. 10 may be directly obtained, based on the foregoing recognized first gesture type (for example, swipe gesture), from a slide trajectory corresponding to the swipe gesture (that is, the slide trajectory 90c shown in FIG. 10).

As shown in FIG. 10, the user terminal may determine, based on the trigger position 90b and the trigger position 90a, a position information difference between the start trigger position and the end trigger position (that is, slide length of the slide trajectory 90c shown in FIG. 10). In this embodiment of this application, the information position difference may be a coordinate value (for example, X3) of the trigger position 90b minus a coordinate value (for example, X4) of the trigger position 90a under the screen coordinate system, and then based on a position information difference between X3 and X4 (for example, X3−X4=X34), a difference attribute of the position information difference in the auxiliary reference direction shown in FIG. 10 may be determined, so that it may be further determined based on the difference attribute that a slide direction indicated by the slide trajectory 80c shown in FIG. 10 is leftward slide.

As shown in FIG. 10, in this case, the slide direction (that is, leftward slide direction) is opposite to the auxiliary reference direction (or progress control direction) shown in FIG. 10, that is, the difference attribute specifically means that the difference attribute of the position information difference (that is, X34) is a positive number. For example, as shown in FIG. 10, when the X-axis direction under the foregoing screen coordinate system is used as the auxiliary reference direction, and the user slides from right to left on the touchscreen of the user terminal shown in FIG. 10, the user terminal may determine, based on the foregoing screen capture technology, that the difference (that is, X34) of the position information is a positive number. That is, in this case, the user terminal may determine, when determining that the coordinate value X3 is greater than the coordinate value X4, that the difference attribute is a positive number, then may determine, when the difference attribute is a positive number, that the slide direction indicated by the slide trajectory 90c is leftward slide, and then may determine a progress duration (for example, T'=5 seconds) of the current leftward slide, so that the user terminal may still intelligently trigger, based on the slide direction corresponding to the foregoing swipe gesture, a function of controlling the playing progress of the currently played video data without displaying the progress bar. In this case, the slide direction is opposite to the progress control direction in FIG. 10, and then the foregoing progress duration may be determined as the rewinding duration in the slide direction, to cause the currently played video frame (for example, the video frame 800*a* shown in FIG. 10) to jump to a video frame before 5 seconds (for example, a video frame 800*b* shown in FIG. 10), to implement rewinding playing precise to seconds during playing of the video data.

It may be understood that, during playing of the video data, the progress control direction of the video data is from left to right playing. Therefore, to ensure fluency of playing the video data, the to-be-played first video sequence obtained from the server is continuously stored in the foregoing cached database. It may be understood that, to reduce resource waste phenomena caused because the video data occupies memory resources of the terminal, in this embodiment of this application, video data that has been played by the application client (that is, the foregoing video client) may be deleted. In this way, after performing a swipe gesture of leftward slide for the video frame 800*a* shown in FIG. 10, the user needs to again request a video sequence within this period of time before 5 seconds from the service server shown in FIG. 10, and the video sequence that is again requested may be collectively referred to as the second video sequence.

It may be understood that, as shown in FIG. 10, during playing of the video data, the user terminal may transmit a new video data loading request (for example, loading request 2) to the service server corresponding to the user terminal. In this way, when receiving the new video data loading request (for example, loading request 2), the service server may obtain the second video sequence associated with the rewinding duration from the video database shown in FIG. 10. The second video sequence may include a key data frame corresponding to a second target time stamp (that is, a new first target time stamp determined based on the initial time stamp and the rewinding duration) and the transitional video frame corresponding to the initial time stamp. As shown in FIG. 10, the key data frame may be a first video frame (for example, shown in FIG. 10) of the second video sequence shown in FIG. 10, and the second target time stamp may be determined by the initial time stamp and the rewinding duration.

It may be understood that, when receiving the second video sequence returned by the server, the user terminal may fast-forward the video frame of the video data from the foregoing transitional video frame (for example, video frame 800*a*) to the key data frame, and then may use, based on the second target time stamp corresponding to the key data frame, the second video sequence as new playing-progress-adjusted video data. In some embodiments, it may be understood that, after obtaining the foregoing second video sequence, the user terminal may further add the second video sequence to the foregoing cached database, to subsequently use the second video sequence cached in the cached database as a new cached video sequence, to ensure data playing coherence and fluency in the user terminal.

It may be understood that, to improve data transmission efficiency, in this embodiment of this application, the server may further encode the second video sequence obtained from the video database, and then may return the encoded video encoding bitstream to the user terminal shown in FIG. 10. In this way, when receiving the video encoding bitstream returned by the service server, the user terminal may determine, based on a decoding rule corresponding to the encoding rule stored in the application client, the second encoding code rate corresponding to the first encoding code rate, and then may decode the video encoding bitstream based on the second encoding code rate, to obtain the second video sequence through decoding. It may be understood that, the video encoding bitstream may be obtained after the service server encodes the second video sequence according to a first encoding code rate (for example, encoding code rate 1); the first encoding code rate (for example, encoding code rate 1) may be obtained after the service server performs code rate control on a second encoding code rate (for example, encoding code rate 2 greater than the encoding code rate 1) according to an encoding rule; and that is, in this embodiment of this application, the first encoding code rate may be less than the second encoding code rate. In this way, during data transmission between the service server and the user terminal, through code rate control, data transmission efficiency may be improved, and a loading duration for loading the second video sequence may be further shortened in the user terminal.

In some implementations, when receiving a new video data loading request, the service server may obtain a new video sequence from a video database, and encode the new video sequence with an encoding code rate that is smaller than a regular encoding code rate, so that the new video sequence transmitted from the service server to the user terminal has a smaller size. In this way, during data transmission between the service server and the user terminal, through controlling the encoding code rate, data transmission efficiency may be improved, and a loading duration for loading the second video sequence may be further shortened in the user terminal.

It may be understood that, in this embodiment of this application, a specific angle (for example, 145 degrees, even if a component (for example, component y) in a Y-axis direction exists when the user performs a slide operation on the touchscreen of the user terminal, the component may be ignored) may further exist between the auxiliary reference direction shown in FIG. 10 and a difference vector K of the position information difference determined based on the start trigger position and the end trigger position of the slide trajectory. In this way, this means that in this embodiment of this application, even if a component of the difference vector K exists in the auxiliary reference direction (that is, a component of the difference vector K, for example, component x exists on the X-axis), a difference attribute of the component of the difference vector on the X-axis (for example, component x) may be indirectly calculated, then a slide direction indicated by the slide trajectory may be further determined, then a playing progress of the video data may be controlled based on a progress duration in the slide direction (for example, the foregoing fast-forwarding duration or rewinding duration), and then flexibility of this function for triggering the playing progress control precise to seconds may be enriched.

It is to be understood that, the fast-forwarding duration or rewinding duration may be a default progress duration (for example, 5 seconds). To accurately meet a requirement of each user for control over the playing progress of the video data, in this embodiment of this application, a corresponding duration setting control may be further provided, to help the user customize a corresponding progress duration during playing of the video data. For example, for a user A and a user B, when the user A is watching the video data, the progress duration may be changed from 5 seconds to 3 seconds by default. Similarly, when the user B is watching the video data, the required progress duration may be changed from 5 seconds to 10 seconds or the like by default.

Figure 11:
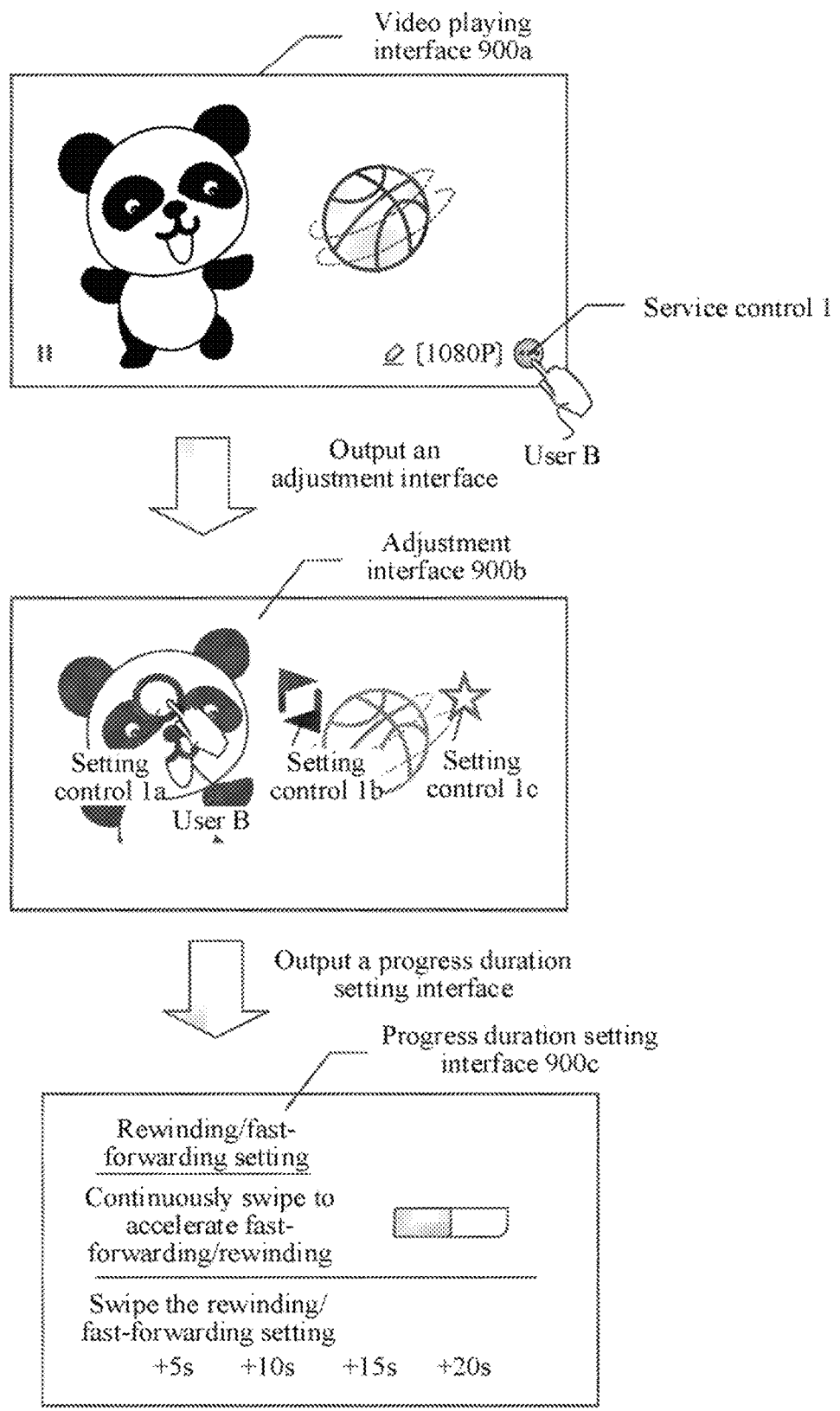
FIG. 11 is a schematic diagram of a scenario of customizing a progress duration according to an embodiment of this application.

For ease of understanding, further, FIG. 11 is a schematic diagram of a scenario of customizing a progress duration according to an embodiment of this application. For ease of understanding, in this embodiment of this application, the user corresponding to the application client being the user B is used as an example. As shown in FIG. 11, the user B may display, in response to a trigger operation performed for a service control 1 in a video playing interface 900a, an adjustment interface 900b shown in FIG. 11. As shown in FIG. 11, the adjustment interface 900b may include a plurality of setting controls, and the plurality of setting controls may specifically include a setting control 1a, a setting control 1b, and a setting control 1c shown in FIG. 11. The setting control 1a may be a control used for customizing a progress duration of video data. As shown in FIG. 11, when the user B performs a trigger operation for the setting control 1a, the user terminal may display, in response to the trigger operation, a progress duration setting interface 900c shown in FIG. 11. It may be understood that, the progress duration setting interface 900c may be used for setting the foregoing rewinding or fast-forwarding setting precise to seconds. For example, the user B may start a function of continuously swiping to accelerate fast-forwarding or accelerate rewinding in the progress duration setting interface 900c. In another example, the user B may set a corresponding default progress duration in the progress duration setting interface 900c. For example, a default progress duration that is set in FIG. 11 is 5 seconds. When the user B performs, in the progress duration setting interface 900c, a trigger operation for a region in which the progress duration (for example, 10 seconds shown in FIG. 11) is located, the progress duration of the video data may be switched from the default progress duration (for example, 5 seconds) to 10 seconds, to meet a requirement of the user B for quickly playing the foregoing video data.

In some embodiments, when the user B starts the function of "continuously swiping to accelerate fast-forwarding or rewinding" in the progress duration setting interface 900c, the user terminal may automatically collect, during playing of the video data, statistics on a user behavior (that is, swipe behavior) of the same slide operation performed by the user in a unit time (for example, 3 s), and then may adaptively control the progress duration of the video data based on whether an accumulated count of performing the same swipe behavior (for example, the foregoing swipe gesture of rightward slide) reaches a preset count threshold corresponding to the unit duration, for example, through an accumulated count threshold. For ease of understanding, an example is taken. If 5 s may be fast-forwarded by default when the foregoing user B swipes once, 5 s may also be fast-forwarded by default when the user B performs a second time of swipe behavior. When the user B continuously swipes 3 times in the specified unit time (for example, 3 s), and the continuous swipe count reaches a count threshold accumulated in the unit duration (for example, the count threshold may be 3 times), the user terminal may intelligently trigger an adaptive adjustment condition, to automatically start an adaptive adjustment task. The adaptive adjustment task may be performing the foregoing "function of continuously swiping to accelerate fast-forwarding or rewinding", thereby flexibly controlling a longer fast-forwarding duration. For example, when performing the swipe behavior for the third time, the user B may update the progress duration in the slide direction based on the adaptive adjustment task, and then may directly fast-forward by 10 s instead of 5 s by default to perform playing, to accelerate control over the playing progress of the video data. It may be understood that, the updated progress duration (for example, 10 s) is greater than the to-be-updated progress duration (for example, 5 seconds). In some embodiments, in this embodiment of this application, after fast-forwarding is performed by 10 s to play, the foregoing "function of continuously swiping to accelerate fast-forwarding or rewinding" may be automatically disabled. In this way, when the swipe behavior is performed for the fourth time, the current swipe behavior may be used as a new first time of swipe behavior, and then playing may continue to be performed by fast-forwarding by 5 seconds.

Figure 12:
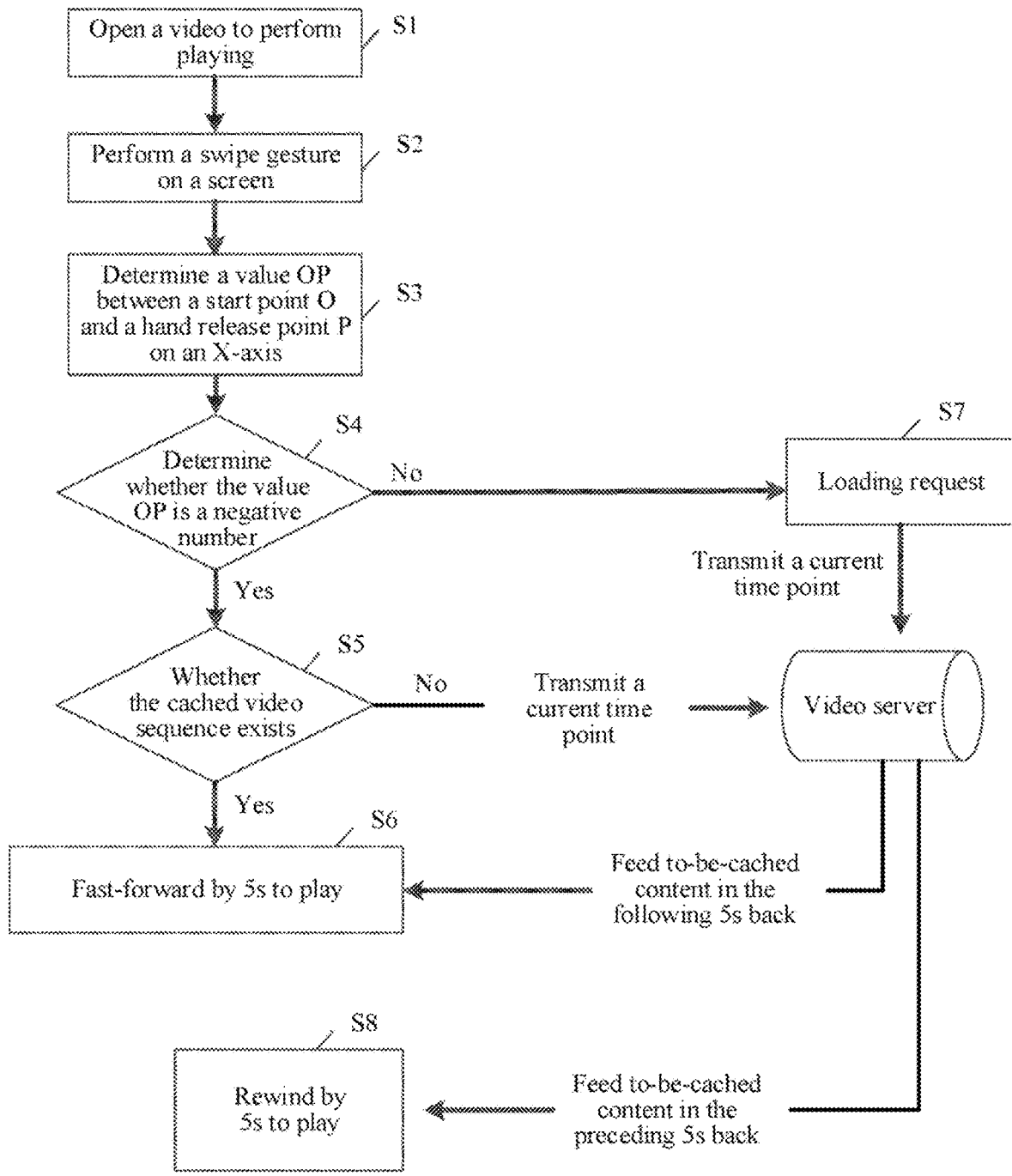
FIG. 12 is a schematic flowchart of adjusting a playing progress of video data according to an embodiment of this application.

Further, for ease of understanding, FIG. 12 is a schematic flowchart of controlling a playing progress of video data according to an embodiment of this application. As shown in FIG. 12, a user may perform step S1 through a user terminal: Open a video to perform playing. Further, the user may perform step S2, that is, may perform a swipe gesture on a screen. In this case, the user terminal may perform step S3, to determine a value OP between a start point O (that is, the foregoing start trigger position) and a hand release point P (that is, the foregoing end trigger position) on an X-axis. For a specific implementation process in which the user terminal obtains the value OP between the two points on the X-axis, reference may be made to the description of the position information difference in the foregoing embodiment corresponding to FIG. 9, and details do not continue to be described herein. Further, as shown in FIG. 12, the user terminal may further perform step S4, to determine whether a difference attribute of the value OP is a positive number or a negative number. In a case that the difference attribute of the value OP is a negative number, step S5 shown in FIG. 12 may be further performed, to determine whether the foregoing cached video sequence exists in the user terminal locally. In a case that the foregoing cached video sequence exists in the user terminal locally, step S6 shown in FIG. 12 may be performed; otherwise, a current time point may be transmitted to a video server shown in FIG. 12. The video server may be the service server in the foregoing embodiment corresponding to FIG. 9, and video content in the following 5 s fed by the service server back to the user terminal may be the foregoing first video sequence. A specific process of obtaining the first video sequence is not described in detail herein. Similarly, video content in the preceding 5 s fed by the service server back to the user terminal may be the foregoing second video sequence. A specific process of obtaining the second video sequence is not described in detail herein. In some embodiments, as shown in FIG. 12, when determining that the value OP is a non-negative number (for example, integer), the user terminal may further perform a loading request shown in FIG. 12, to trigger a rewinding function precise to seconds in the user terminal.

Therefore, it can be seen that, in this embodiment of this application, during playing of video data, the computer device (that is, the foregoing user terminal) may receive a slide operation performed by the user in any position region of the touchscreen, and then may start, in a case of recognizing that an operation gesture corresponding to the slide operation belongs to a first gesture type (for example, swipe gesture), a function of precisely controlling a progress duration of the video data. In this way, when obtaining a start trigger position and an end trigger position from a slide trajectory corresponding to the first gesture type, the computer device (that is, the foregoing user terminal) may determine a slide direction indicated by the slide trajectory based on the start trigger position and the end trigger position, and then may accurately control the playing progress of the video data based on the slide direction and the foregoing progress control direction, to ensure that playing precision of the video data can be accurately controlled.

Figure 13:
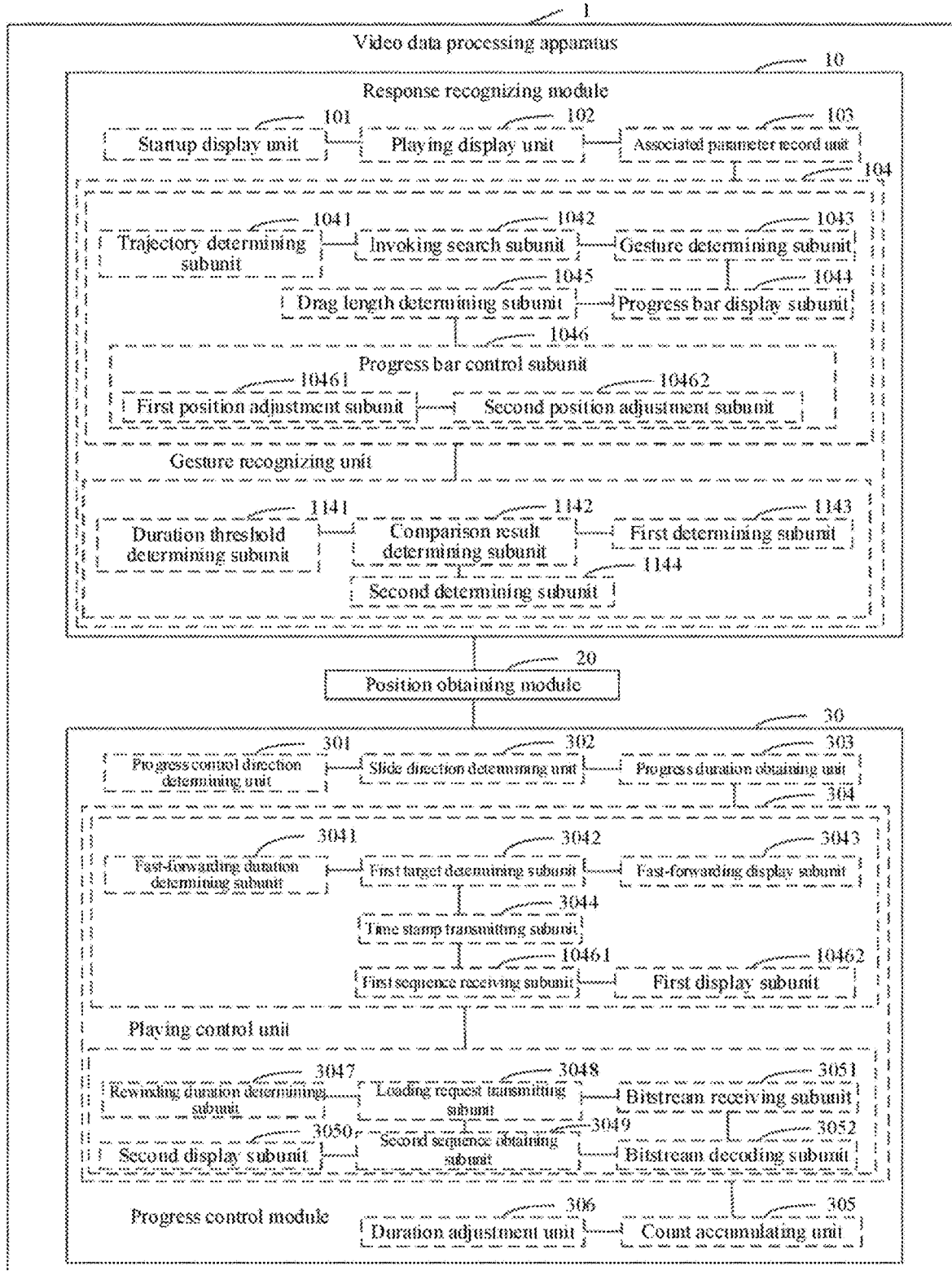
FIG. 13 is a schematic structural diagram of a video data processing apparatus according to an embodiment of this application.

Further, FIG. 13 is a schematic structural diagram of a video data processing apparatus according to an embodiment of this application. The video data processing apparatus 1 may include: a response recognizing module 10, a position obtaining module 20, and a progress control module 30.

The response recognizing module 10 is configured to display a video playing interface corresponding to video data, and recognize, in response to a slide operation performed for the video playing interface, an operation gesture corresponding to the slide operation;

the position obtaining module 20 is configured to obtain, in a case of recognizing that the operation gesture belongs to a first gesture type, a start trigger position and an end trigger position of the slide operation from a slide trajectory corresponding to the first gesture type, the first gesture type being used for adjusting a playing progress of the video data by a preset progress duration; and the progress control module 30 is configured to determine, based on the start trigger position and the end trigger position, a slide direction indicated by the slide trajectory, adjust, based on the slide direction and a progress control direction of a progress bar in the video playing interface, the playing progress of the video data by the preset progress duration, and display, on the video playing interface, playing-progress-adjusted video data.

The response recognizing module 10 includes: a startup display unit 101, a playing display unit 102, an associated parameter record unit 103, and a gesture recognizing unit 104.

The startup display unit 101 is configured to display, in response to a startup operation for an application client, an application display interface corresponding to the application client; and the playing display unit 102 is configured to display, in response to a playing operation for video data in the application display interface, a video playing interface corresponding to the video data.

It may be understood that, the video data may be selected by a user corresponding to the application client from recommended video data presented on the application display interface. In some embodiments, the video data herein may alternatively be obtained after the user performs video search through a search region in the application display interface.

The associated parameter record unit 103 is configured to record, in response to a slide operation performed for the video playing interface, a slide associated parameter associated with the slide operation; and the gesture recognizing unit 104 is configured to recognize, based on the slide associated parameter, an operation gesture corresponding to the slide operation.

The slide associated parameter includes position information of N screen touch points; the N screen touch points are captured in a case that a user presses a touchscreen corresponding to the video playing interface; and N is a positive integer.

The gesture recognizing unit 104 includes: a trajectory determining subunit 1041 and an invoking search subunit 1042. In some embodiments, the gesture recognizing unit 104 further includes: a gesture determining subunit 1043, a progress bar display subunit 1044, a drag length determining subunit 1045, and a progress bar control subunit 1046.

The trajectory determining subunit 1041 is configured to obtain the position information of the N screen touch points from the slide associated parameter, and determine, based on the position information of the N screen touch points, a slide trajectory formed by the N screen touch points; and the invoking search subunit 1042 is configured to invoke a system gesture library corresponding to the application client, and determine, in a case that a trajectory matching the slide trajectory is found by searching the system gesture library, that the operation gesture corresponding to the slide operation belongs to the first gesture type.

In some embodiments, the gesture determining subunit 1043 is configured to determine, in a case that no trajectory matching the slide trajectory is found by searching the system gesture library, that the operation gesture corresponding to the slide operation belongs to a second gesture type; the second gesture type is used for instructing the application client to start a progress drag function of the progress bar corresponding to the video data;

the progress bar display subunit 1044 is configured to determine a time progress adjustment rule based on the progress drag function, display the progress bar of the video data on the video playing interface based on the time progress adjustment rule, and determine a slide operation corresponding to the second gesture type as a drag operation;

the drag length determining subunit 1045 is configured to determine a first progress position corresponding to the drag operation on the progress bar, and determine, based on a drag trajectory corresponding to the drag operation, a drag direction and a drag length of the drag trajectory; and the progress bar control subunit 1046 is configured to control the progress bar of the video data based on the first progress position, the drag direction, and the drag length.

The progress bar control subunit 1046 includes: a first position adjustment subunit 10461 and a second position adjustment subunit 10462;

the first position adjustment subunit 10461 is configured to adjust, in a case that the drag direction is the same as the progress control direction of the progress bar, the progress bar of the video data from the first progress position to a second progress position based on a first drag progress value to which the drag length is mapped, where the second progress position is greater than the first progress position, and a progress difference between the second progress position and the first progress position is the first drag progress value; and the second position adjustment subunit 10462 is configured to adjust, in a case that the drag direction is opposite to the progress control direction of the progress bar, the progress bar of the video data from the first progress position to a third progress position based on a second drag progress value to which the drag length is mapped, where the third progress position is less than the first progress position, and a progress difference between the first progress position and the third progress position is the second drag progress value.

For a specific implementation of the first position adjustment subunit 10461 and the second position adjustment subunit 10462, reference may be made to the description of the second gesture type in the foregoing embodiment corresponding to FIG. 3, and details do not continue to be described herein.

For a specific implementation of the trajectory determining subunit 1041, the invoking search subunit 1042, the gesture determining subunit 1043, the progress bar display subunit 1044, the drag length determining subunit 1045, and the progress bar control subunit 1046, reference may be made to the description of the specific process of controlling the progress position of the progress bar in the foregoing embodiment corresponding to FIG. 3, and details do not continue to be described herein.

For a specific implementation of the startup display unit 101, the playing display unit 102, the associated parameter record unit 103, and the gesture recognizing unit 104, reference may be made to the description of step S101 in the foregoing embodiment corresponding to FIG. 3, and details do not continue to be described herein.

In some embodiments, the slide associated parameter includes a press duration corresponding to N screen touch points; and the press duration is obtained through statistics in a case that a user presses a touchscreen corresponding to the video playing interface.

The gesture recognizing unit 104 includes: a duration threshold determining subunit 1141, a comparison result determining subunit 1142, a first determining subunit 1143, and a second determining subunit 1144;

the duration threshold determining subunit 1141 is configured to determine, based on the press duration in the slide associated parameter, a duration threshold corresponding to the press duration;

the comparison result determining subunit 1142 is configured to compare the press duration with the duration threshold, to obtain a comparison result; and the first determining subunit 1143 is configured to determine, in a case that the comparison result indicates that the press duration is less than the duration threshold, that the operation gesture corresponding to the slide operation belongs to the first gesture type.

In some embodiments, the second determining subunit 1144 is configured to determine, in a case that the comparison result indicates that the press duration is greater than or equal to the duration threshold, that the operation gesture corresponding to the slide operation belongs to a second gesture type.

For a specific implementation of the duration threshold determining subunit 1141, the comparison result determining subunit 1142, the first determining subunit 1143, and the second determining subunit 1144, reference may be made to the description of the press duration in the foregoing embodiment corresponding to FIG. 3, and details do not continue to be described herein.

Both the start trigger position and the end trigger position belong to position information of screen touch points under a screen coordinate system corresponding to a touchscreen; and the touchscreen is used for displaying the video playing interface corresponding to the video data.

The progress control module 30 includes: a progress control direction determining unit 301, a slide direction determining unit 302, a progress duration obtaining unit 303, a playing control unit 304, a count accumulating unit 305, and a duration adjustment unit 306;

the progress control direction determining unit 301 is configured to determine, in a case that the touchscreen corresponding to the video playing interface is in a landscape state, a first shaft coordinate direction under the screen coordinate system as an auxiliary reference direction, and determine the progress control direction of the progress bar in the video playing interface based on the auxiliary reference direction;

the slide direction determining unit 302 is configured to determine a position information difference between the start trigger position and the end trigger position, determine a difference attribute of the position information difference in the auxiliary reference direction, and determine, based on the difference attribute, the slide direction indicated by the slide trajectory;

the progress duration obtaining unit 303 is configured to use a video frame corresponding to the start trigger position of the slide operation as a transitional video frame, and use a playing time stamp of the transitional video frame as an initial time stamp; and the playing control unit 304 is configured to adjust, based on the initial time stamp, the preset progress duration, the slide direction, and the progress control direction, the playing progress of the video data by the preset progress duration, and display, on the video playing interface, the playing-progress-adjusted video data.

The playing control unit 304 includes: a fast-forwarding duration determining subunit 3041, a first target determining subunit 3042, and a fast-forwarding display subunit 3043. In some embodiments, the playing control unit 304 further includes: a time stamp transmitting subunit 3044, a first sequence receiving subunit 3045, and a first display subunit 3046. In some embodiments, the playing control unit 304 further includes: a rewinding duration determining subunit 3047, a loading request transmitting subunit 3048, a second sequence obtaining subunit 3049, and a second display subunit 3050. In some embodiments, the playing control unit 304 further includes: a bitstream receiving subunit 3051 and a bitstream decoding subunit 3052.

The fast-forwarding duration determining subunit 3041 is configured to determine, in a case that the slide direction is the same as the progress control direction, the preset progress duration as a fast-forwarding duration in the slide direction;

the first target determining subunit 3042 is configured to determine, based on the initial time stamp and the fast-forwarding duration, a first target time stamp corresponding to the video data; and the fast-forwarding display subunit 3043 is configured to fast-forward, in a case that a cached data frame corresponding to the first target time stamp and a cached video sequence corresponding to the cached data frame are found by searching a cached database corresponding to the video data, a video frame of the video data from the transitional video frame to the cached data frame; and use the cached video sequence corresponding to the cached data frame as the playing-progress-adjusted video data, and display the playing-progress-adjusted video data on the video playing interface, where the cached data frame is a first video frame of the cached video sequence.

In some embodiments, the time stamp transmitting subunit 3044 is configured to transmit, in a case that no cached data frame corresponding to the first target time stamp is found by searching the cached database corresponding to the video data, the initial time stamp and the fast-forwarding duration to a service server, to cause the service server to obtain, based on the initial time stamp, a first video sequence associated with the fast-forwarding duration, where the first video sequence includes a target data frame corresponding to the first target time stamp, and the target data frame is a first video frame of the first video sequence;

the first sequence receiving subunit 3045 is configured to receive the first video sequence returned by the service server, and fast-forwarding the video frame of the video data from the transitional video frame to the target data frame; and the first display subunit 3046 is configured to use, based on the first target time stamp corresponding to the target data frame, the first video sequence as the playing-progress-adjusted video data, and display the playing-progress-adjusted video data on the video playing interface.

In some embodiments, the rewinding duration determining subunit 3047 is configured to determine, in a case that the slide direction is opposite to the progress control direction, the preset progress duration as a rewinding duration in the slide direction, and generate a video data loading request based on the initial time stamp and the rewinding duration;

the loading request transmitting subunit 3048 is configured to transmit the video data loading request to a service server, to cause the service server to obtain, based on the initial time stamp, a second video sequence associated with the rewinding duration, where the second video sequence includes a key data frame corresponding to a second target time stamp and the transitional video frame corresponding to the initial time stamp; and the key data frame is a first video frame of the second video sequence, and the second target time stamp is determined by the initial time stamp and the rewinding duration;

the second sequence obtaining subunit 3049 is configured to obtain the second video sequence, and rewind a video frame of the video data from the transitional video frame to the key data frame; and the second display subunit 3050 is configured to use, based on the second target time stamp corresponding to the key data frame, the second video sequence as the playing-progress-adjusted video data, and display the playing-progress-adjusted video data on the video playing interface.

In some embodiments, the bitstream receiving subunit 3051 is configured to receive a video encoding bitstream returned by the service server, where the video encoding bitstream is obtained after the service server encodes the second video sequence according to a first encoding code rate; the first encoding code rate is obtained after the service server performs code rate control on a second encoding code rate according to an encoding rule; and the first encoding code rate is less than the second encoding code rate; and the bitstream decoding subunit 3052 is configured to determine, based on a decoding rule corresponding to the encoding rule, the second encoding code rate corresponding to the first encoding code rate, and decode the video encoding bitstream based on the second encoding code rate, to obtain the second video sequence.

For a specific implementation of the fast-forwarding duration determining subunit 3041, the first target determining subunit 3042, the fast-forwarding display subunit 3043, the time stamp transmitting subunit 3044, the first sequence receiving subunit 3045, the first display subunit 3046, the rewinding duration determining subunit 3047, the loading request transmitting subunit 3048, the second sequence obtaining subunit 3049, the second display subunit 3050, the bitstream receiving subunit 3051, and the bitstream decoding subunit 3052, reference may be made to the description of the first video sequence and the second video sequence in the foregoing embodiment corresponding to FIG. 9, and details do not continue to be described herein.

For a specific implementation of the progress control direction determining unit 301, the slide direction determining unit 302, the progress duration obtaining unit 303, and the playing control unit 304, reference may be made to the description of the specific process of adjusting the playing progress of the video data in the foregoing embodiment corresponding to FIG. 3, and details do not continue to be described herein.

In some embodiments, the count accumulating unit 305 is configured to accumulate a count of performing a slide operation in a unit statistical duration; and the duration adjustment unit 306 is configured to start an adaptive adjustment task in a case that the count reaches a count threshold corresponding to the unit statistical duration, and update a progress duration in the slide direction based on the adaptive adjustment task, where the updated progress duration is greater than the to-be-updated progress duration.

For a specific implementation of the count accumulating unit 305 and the duration adjustment unit 306, reference may be made to the description of the specific process of performing the swipe behavior in the unit duration in the foregoing embodiment corresponding to FIG. 9, and details do not continue to be described herein.

For a specific implementation of the response recognizing module 10, the position obtaining module 20, and the progress control module 30, reference may be made to the description of step S101 to step S103 in the foregoing embodiment corresponding to FIG. 3, and details do not continue to be described herein. It can be understood that the video data processing apparatus 1 described in this embodiment of this application can perform the video data processing method in the foregoing embodiment corresponding to FIG. 3 or FIG. 9. Details are not repeated herein. Therefore, it can be seen that, in this embodiment of this application, during playing of video data, a user is allowed to perform a slide operation in any position region of a touchscreen, to enable the computer device (for example, the user terminal) to quickly start, in a case of recognizing that an operation gesture corresponding to the slide operation belongs to a first gesture type (for example, swipe gesture), a function of precisely controlling a progress duration, so that when a start trigger position and an end trigger position are obtained from a slide trajectory corresponding to the first gesture type subsequently, a slide direction indicated by the slide trajectory may be determined quickly based on the start trigger position and the end trigger position, and then the playing progress of the video data may be accurately adjusted based on the slide direction and a progress control direction, to control playing precision of the video data.

Figure 14:
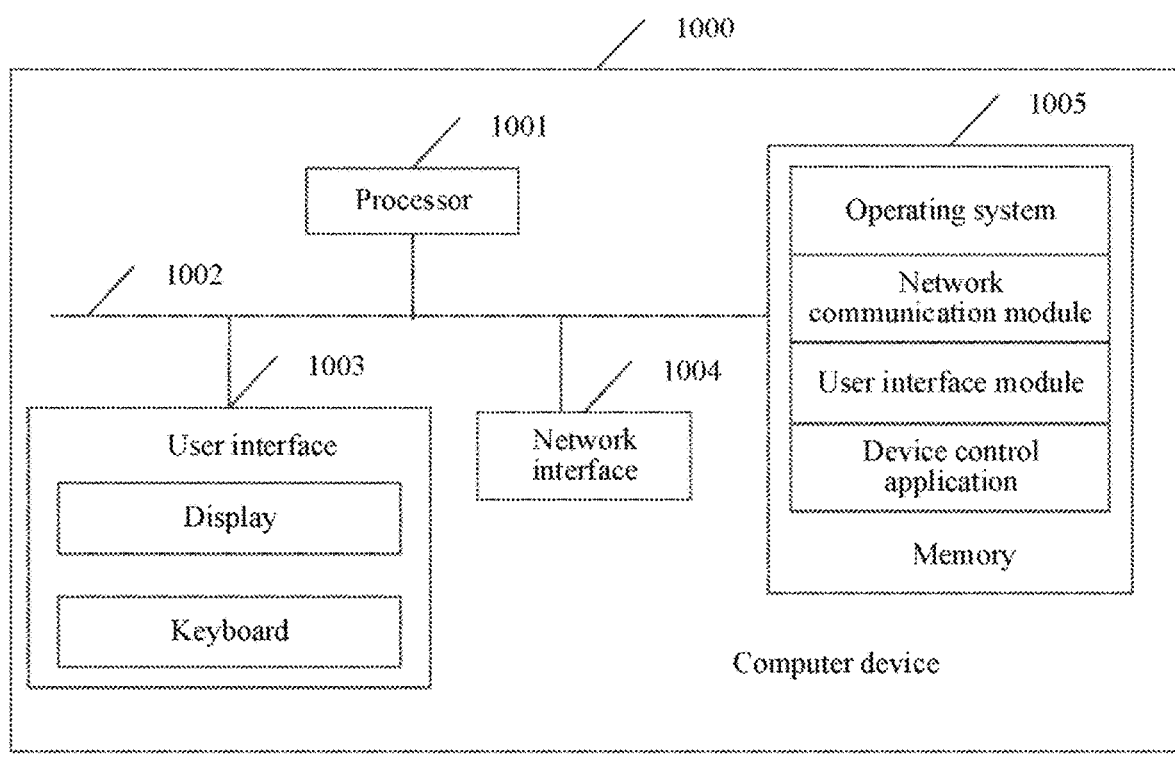
FIG. 14 is a schematic structural diagram of a computer device according to an embodiment of this application.

Further, FIG. 14 is a schematic structural diagram of a computer device according to an embodiment of this application. As shown in FIG. 14, the computer device 1000 may be a user terminal. The user terminal may be the user terminal 3000*a* in the foregoing embodiment corresponding to FIG. 1. In some embodiments, the computer device 1000 may alternatively be a service server, and the service server may be the service server 2000 in the foregoing embodiment corresponding to FIG. 1. For ease of understanding, in this embodiment of this application, the computer device being a user terminal is used as an example. In this case, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display, a keyboard, and optionally, the user interface 1003 may further include a standard wired interface and a standard wireless interface. The network interface 1004 may include a standard wired interface and a standard wireless interface (such as a Wi-Fi interface). The memory 1005 may be a high-speed RAM, or may be a non-volatile memory, for example, at least one magnetic disk memory. The memory 1005 may alternatively be at least one storage apparatus located away from the processor 1001. As shown in FIG. 14, the memory 1005 used as a computer storage medium may include an operating system, a network communication module, a user interface module, and a device control application.

The network interface 1004 in the computer device 1000 may further provide a network communication function. In addition, optionally the user interface 1003 may further include a display and a keyboard. In the computer device 1000 shown in FIG. 14, the network interface 1004 may be configured to provide a network communication function. The user interface 1003 is mainly configured to provide an input interface for a user. The processor 1001 may be configured to invoke the device control application stored in the memory 1005, to implement the following operations:

displaying a video playing interface corresponding to video data, and recognizing, in response to a slide operation performed for the video playing interface, an operation gesture corresponding to the slide operation;

obtaining, in a case of recognizing that the operation gesture belongs to a first gesture type, a start trigger position and an end trigger position of the slide operation from a slide trajectory corresponding to the first gesture type, the first gesture type being used for adjusting a playing progress of the video data by a preset progress duration; and determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data.

It is to be understood that the computer device 1000 described in this embodiment of this application can perform the video data processing method in the foregoing embodiment corresponding to FIG. 3 or FIG. 9, and can also perform steps performed by the video data processing apparatus 1 in the foregoing embodiment corresponding to FIG. 13. Details are not repeated herein. In addition, beneficial effects achieved by using the same method are not described herein again.

In addition, an embodiment of this application further provides a computer storage medium. The computer storage medium stores computer programs executed by the foregoing video data processing apparatus 1. The computer program includes program instructions. When executing the program instructions, a processor can perform the video data processing method described in the foregoing embodiment corresponding to FIG. 3 or FIG. 9. Therefore, details are not repeated herein. In addition, beneficial effects achieved by using the same method are not described herein again. For technical details that are not disclosed in the embodiment of the computer storage medium of this application, refer to the descriptions of the method embodiments of this application.

In various embodiments in the present disclosure, a unit (or a sub-unit) may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module (or a sub-module) may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

It may be understood that an embodiment of this application further provides a computer program product or a computer program. The computer program product or the computer program includes computer instructions. The computer instructions are stored in a computer-readable storage medium. A processor of a computer device reads the computer instructions from the computer-readable storage medium. The processor executes the computer instructions, to cause the computer device to perform the video data processing method described in the foregoing embodiment corresponding to FIG. 3 or FIG. 9. Therefore, details are not described herein again. In addition, beneficial effects achieved by using the same method are not described herein again. For technical details that are not disclosed in the embodiment of the computer storage medium of this application, refer to the descriptions of the method embodiments of this application.

A person of ordinary skill in the art may understand that all or some of the procedures of the methods of the foregoing embodiments may be implemented by a computer program instructing relevant hardware. The program may be stored in a computer-readable storage medium. When the program is executed, the procedures of the foregoing method embodiments may be implemented. The storage medium may be a magnetic disk, an optical disc, a read-only memory (ROM), a random access memory (RAM), or the like.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A method for processing video data, comprising:
 displaying, by a device comprising a memory storing instructions and a processor in communication with the memory, a video playing interface corresponding to video data, and recognizing an operation gesture corresponding to a slide operation performed on the video playing interface;
 determining, by the device according to the slide operation, whether the operation gesture belongs to a first gesture type, wherein
   the first gesture type is used for adjusting a playing progress of the video data by a preset progress duration;

in response to determining that the operation gesture belongs to the first gesture type, obtaining, by the device, a start trigger position and an end trigger position of the slide operation from a slide trajectory of the slide operation; and determining, by the device based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data, wherein a slide associated parameter comprises a summation press duration indicating a summation of a plurality of press durations, each press duration corresponding to a respective one of N screen touch points occurring at different locations in the video playing interface, wherein the summation press duration is obtained by adding together the plurality of press durations; and the recognizing, based on the slide associated parameter, the operation gesture corresponding to the slide operation comprises:

determining, based on the summation press duration in the slide associated parameter, a duration threshold corresponding to the press duration, comparing the summation press duration with the duration threshold, to obtain a comparison result, in response to the comparison result indicating that the press duration is less than the duration threshold, determining that the operation gesture corresponding to the slide operation belongs to the first gesture type, and in response to the comparison result indicating that the press duration is greater than the duration threshold, determining that the operation gesture corresponds to a second gesture type, wherein the second gesture type comprises a drag gesture corresponding to the progress bar in the video playing interface.

2. The method according to claim 1, wherein the displaying the video playing interface corresponding to the video data, and recognizing the operation gesture corresponding to the slide operation performed on the video playing interface comprises:

displaying, in response to a startup operation for an application client, an application display interface corresponding to the application client;

displaying, in response to a playing operation for the video data in the application display interface, the video playing interface corresponding to the video data;

recording, in response to the slide operation performed on the video playing interface, the slide associated parameter corresponding to the slide operation; and recognizing, based on the slide associated parameter, the operation gesture corresponding to the slide operation.

3. The method according to claim 2, wherein:

the slide associated parameter comprises position information of N screen touch points, wherein the N screen touch points are captured when a user presses a touchscreen corresponding to the video playing interface and N is a positive integer; and the recognizing, based on the slide associated parameter, the operation gesture corresponding to the slide operation comprises:

obtaining the position information of the N screen touch points from the slide associated parameter, and determining, based on the position information of the N screen touch points, the slide trajectory formed by the Nscreentouch points, invoking a system gesture library corresponding to the application client, and in response to a trajectory matching the slide trajectory being found by searching the system gesture library, determining that the operation gesture corresponding to the slide operation belongs to the first gesture type.

4. The method according to claim 3, further comprising:

in response to no trajectory matching the slide trajectory being found by searching the system gesture library:

determining that the operation gesture corresponding to the slide operation belongs to the second gesture type, wherein the second gesture type is used for instructing the application client to start a progress drag function of the progress bar corresponding to the video data;

determining a time progress adjustment rule based on the progress drag function, displaying the progress bar of the video data on the video playing interface based on the time progress adjustment rule, and determining a slide operation corresponding to the second gesture type as a drag operation;

determining a first progress position corresponding to the drag operation on the progress bar, and determining, based on a drag trajectory corresponding to the drag operation, a drag direction and a drag length of the drag trajectory; and controlling the progress bar of the video data based on the first progress position, the drag direction, and the drag length.

5. The method according to claim 4, wherein the controlling the progress bar of the video data based on the first progress position, the drag direction, and the drag length comprises:

in response to the drag direction being same as the progress control direction of the progress bar, adjusting the progress bar of the video data from the first progress position to a second progress position based on a first drag progress value to which the drag length is mapped, wherein the second progress position is greater than the first progress position, and a progress difference between the second progress position and the first progress position is the first drag progress value; and in response to the drag direction being opposite to the progress control direction of the progress bar, adjusting the progress bar of the video data from the first progress position to a third progress position based on a second drag progress value to which the drag length is mapped, wherein the third progress position is less than the first progress position, and a progress difference between the first progress position and the third progress position is the second drag progress value.

6. The method according to claim 1, wherein:

the start trigger position and the end trigger position are position information of screen touch points under a screen coordinate system corresponding to a touchscreen, wherein the touchscreen is used for displaying the video playing interface corresponding to the video data; and the determining, based on the start trigger position and the end trigger position, the slide direction indicated by the slide trajectory, adjusting, based on the slide direction and the progress control direction of the progress bar in the video playing interface, the playing progress of the video data by the preset progress duration, and displaying, on the video playing interface, the playing-progress-adjusted video data comprises:
- in response to the touchscreen corresponding to the video playing interface being in a landscape state, determining a first shaft coordinate direction under the screen coordinate system as an auxiliary reference direction, and determining the progress control direction of the progress bar in the video playing interface based on the auxiliary reference direction,
- determining a position information difference between the start trigger position and the end trigger position, determining a difference attribute of the position information difference in the auxiliary reference direction, and determining, based on the difference attribute, the slide direction indicated by the slide trajectory,
- using a video frame corresponding to the start trigger position of the slide operation as a transitional video frame, and using a playing time stamp of the transitional video frame as an initial time stamp, and
- adjusting, based on the initial time stamp, the preset progress duration, the slide direction, and the progress control direction, the playing progress of the video data by the preset progress duration, and displaying, on the video playing interface, the playing-progress-adjusted video data.

7. An apparatus for processing video data, the apparatus comprising:
- a memory storing instructions; and
- a processor in communication with the memory, wherein, when the processor executes the instructions, the processor is configured to cause the apparatus to perform:
  - displaying a video playing interface corresponding to video data, and recognizing an operation gesture corresponding to a slide operation performed on the video playing interface,
  - determining, according to the slide operation, whether the operation gesture belongs to a first gesture type, wherein the first gesture type is used for adjusting a playing progress of the video data by a preset progress duration,
  - in response to determining that the operation gesture belongs to the first gesture type, obtaining a start trigger position and an end trigger position of the slide operation from a slide trajectory of the slide operation, and
  - determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data, wherein
  - a slide associated parameter comprises a summation press duration indicating a summation of a plurality of press durations, each press duration corresponding to a respective one of N screen touch points occurring at different locations in the video playing interface, wherein
    - the summation press duration is obtained by adding together the plurality of press durations; and
  - the recognizing, based on the slide associated parameter, the operation gesture corresponding to the slide operation comprises:
    - determining, based on the summation press duration in the slide associated parameter, a duration threshold corresponding to the press duration,
    - comparing the summation press duration with the duration threshold, to obtain a comparison result,
    - in response to the comparison result indicating that the press duration is less than the duration threshold, determining that the operation gesture corresponding to the slide operation belongs to the first gesture type, and
    - in response to the comparison result indicating that the press duration is greater than the duration threshold, determining that the operation gesture corresponds to a second gesture type, wherein the second gesture type comprises a drag gesture corresponding to the progress bar in the video playing interface.

8. The apparatus according to claim 7, wherein, when the processor is configured to cause the apparatus to perform displaying the video playing interface corresponding to the video data, and recognizing the operation gesture corresponding to the slide operation performed on the video playing interface, the processor is configured to cause the apparatus to perform:
- displaying, in response to a startup operation for an application client, an application display interface corresponding to the application client;
- displaying, in response to a playing operation for the video data in the application display interface, the video playing interface corresponding to the video data;
- recording, in response to the slide operation performed on the video playing interface, the slide associated parameter corresponding to the slide operation; and
- recognizing, based on the slide associated parameter, the operation gesture corresponding to the slide operation.

9. The apparatus according to claim 8, wherein:
- the slide associated parameter comprises position information of N screen touch points, wherein the N screen touch points are captured when a user presses a touchscreen corresponding to the video playing interface and N is a positive integer; and
- when the processor is configured to cause the apparatus to perform recognizing, based on the slide associated parameter, the operation gesture corresponding to the slide operation, the processor is configured to cause the apparatus to perform:
  - obtaining the position information of the N screen touch points from the slide associated parameter, and determining, based on the position information of the N screen touch points, the slide trajectory formed by the N screentouch points,
  - invoking a system gesture library corresponding to the application client, and
  - in response to a trajectory matching the slide trajectory being found by searching the system gesture library, determining that the operation gesture corresponding to the slide operation belongs to the first gesture type.

10. The apparatus according to claim 9, wherein, when the processor executes the instructions, the processor is configured to further cause the apparatus to perform:
- in response to no trajectory matching the slide trajectory being found by searching the system gesture library:
  - determining that the operation gesture corresponding to the slide operation belongs to the second gesture type, wherein the second gesture type is used for instructing the application client to start a progress drag function of the progress bar corresponding to the video data;

determining a time progress adjustment rule based on the progress drag function, displaying the progress bar of the video data on the video playing interface based on the time progress adjustment rule, and determining a slide operation corresponding to the second gesture type as a drag operation;

determining a first progress position corresponding to the drag operation on the progress bar, and determining, based on a drag trajectory corresponding to the drag operation, a drag direction and a drag length of the drag trajectory; and controlling the progress bar of the video data based on the first progress position, the drag direction, and the drag length.

11. The apparatus according to claim 10, wherein, when the processor is configured to cause the apparatus to perform controlling the progress bar of the video data based on the first progress position, the drag direction, and the drag length, the processor is configured to cause the apparatus to perform:

in response to the drag direction being same as the progress control direction of the progress bar, adjusting the progress bar of the video data from the first progress position to a second progress position based on a first drag progress value to which the drag length is mapped, wherein the second progress position is greater than the first progress position, and a progress difference between the second progress position and the first progress position is the first drag progress value; and in response to the drag direction being opposite to the progress control direction of the progress bar, adjusting the progress bar of the video data from the first progress position to a third progress position based on a second drag progress value to which the drag length is mapped, wherein the third progress position is less than the first progress position, and a progress difference between the first progress position and the third progress position is the second drag progress value.

12. The apparatus according to claim 7, wherein:

the start trigger position and the end trigger position are position information of screen touch points under a screen coordinate system corresponding to a touchscreen, wherein the touchscreen is used for displaying the video playing interface corresponding to the video data; and when the processor is configured to cause the apparatus to perform determining, based on the start trigger position and the end trigger position, the slide direction indicated by the slide trajectory, adjusting, based on the slide direction and the progress control direction of the progress bar in the video playing interface, the playing progress of the video data by the preset progress duration, and displaying, on the video playing interface, the playing-progress-adjusted video data, the processor is configured to cause the apparatus to perform:

in response to the touchscreen corresponding to the video playing interface being in a landscape state, determining a first shaft coordinate direction under the screen coordinate system as an auxiliary reference direction, and determining the progress control direction of the progress bar in the video playing interface based on the auxiliary reference direction, determining a position information difference between the start trigger position and the end trigger position, determining a difference attribute of the position information difference in the auxiliary reference direction, and determining, based on the difference attribute, the slide direction indicated by the slide trajectory, using a video frame corresponding to the start trigger position of the slide operation as a transitional video frame, and using a playing time stamp of the transitional video frame as an initial time stamp, and adjusting, based on the initial time stamp, the preset progress duration, the slide direction, and the progress control direction, the playing progress of the video data by the preset progress duration, and displaying, on the video playing interface, the playing-progress-adjusted video data.

13. A non-transitory computer-readable storage medium, storing computer-readable instructions, wherein, the computer-readable instructions, when executed by a processor, are configured to cause the processor to perform:

displaying a video playing interface corresponding to video data, and recognizing an operation gesture corresponding to a slide operation performed on the video playing interface, determining, according to the slide operation, whether the operation gesture belongs to a first gesture type, wherein the first gesture type is used for adjusting a playing progress of the video data by a preset progress duration, in response to determining that the operation gesture belongs to the first gesture type, obtaining a start trigger position and an end trigger position of the slide operation from a slide trajectory of the slide operation, and determining, based on the start trigger position and the end trigger position, a slide direction indicated by the slide trajectory, adjusting, based on the slide direction and a progress control direction of a progress bar in the video playing interface, the playing progress of the video data by the preset progress duration, and displaying, on the video playing interface, playing-progress-adjusted video data, wherein a slide associated parameter comprises a summation press duration indicating a summation of a plurality of press durations, each press duration corresponding to a respective one of N screen touch points occurring at different locations in the video playing interface, wherein the summation press duration is obtained by adding together the plurality of press durations; and the recognizing, based on the slide associated parameter, the operation gesture corresponding to the slide operation comprises:

determining, based on the summation press duration in the slide associated parameter, a duration threshold corresponding to the press duration, comparing the summation press duration with the duration threshold, to obtain a comparison result, in response to the comparison result indicating that the press duration is less than the duration threshold, determining that the operation gesture corresponding to the slide operation belongs to the first gesture type, and in response to the comparison result indicating that the press duration is greater than the duration threshold, determining that the operation gesture corresponds to a second gesture type, wherein the second gesture type comprises a drag gesture corresponding to the progress bar in the video playing interface.

14. The non-transitory computer-readable storage medium according to claim 13, wherein, when the computer-readable instructions are configured to cause the processor to perform displaying the video playing interface corresponding to the video data, and recognizing the operation gesture corresponding to the slide operation performed on the video playing interface, the computer-readable instructions are configured to cause the processor to perform:
  displaying, in response to a startup operation for an application client, an application display interface corresponding to the application client;
  displaying, in response to a playing operation for the video data in the application display interface, the video playing interface corresponding to the video data;
  recording, in response to the slide operation performed on the video playing interface, the slide associated parameter corresponding to the slide operation; and
  recognizing, based on the slide associated parameter, the operation gesture corresponding to the slide operation.

15. The non-transitory computer-readable storage medium according to claim 14, wherein:
  the slide associated parameter comprises position information of N screen touch points, wherein the N screen touch points are captured when a user presses a touchscreen corresponding to the video playing interface and N is a positive integer; and
  when the computer-readable instructions are configured to cause the processor to perform recognizing, based on the slide associated parameter, the operation gesture corresponding to the slide operation, the computer-readable instructions are configured to cause the processor to perform:
    obtaining the position information of the N screen touch points from the slide associated parameter, and determining, based on the position information of the N screen touch points, the slide trajectory formed by the N screentouch points,
    invoking a system gesture library corresponding to the application client, and
    in response to a trajectory matching the slide trajectory being found by searching the system gesture library, determining that the operation gesture corresponding to the slide operation belongs to the first gesture type.

16. The non-transitory computer-readable storage medium according to claim 15, wherein, when the computer-readable instructions are executed by the processor, the computer-readable instructions are configured to further cause the processor to perform:
  in response to no trajectory matching the slide trajectory being found by searching the system gesture library:
    determining that the operation gesture corresponding to the slide operation belongs to the second gesture type, wherein the second gesture type is used for instructing the application client to start a progress drag function of the progress bar corresponding to the video data;
    determining a time progress adjustment rule based on the progress drag function, displaying the progress bar of the video data on the video playing interface based on the time progress adjustment rule, and determining a slide operation corresponding to the second gesture type as a drag operation;
    determining a first progress position corresponding to the drag operation on the progress bar, and determining, based on a drag trajectory corresponding to the drag operation, a drag direction and a drag length of the drag trajectory; and
    controlling the progress bar of the video data based on the first progress position, the drag direction, and the drag length.

17. The non-transitory computer-readable storage medium according to claim 16, wherein, when the computer-readable instructions are configured to cause the processor to perform controlling the progress bar of the video data based on the first progress position, the drag direction, and the drag length, the computer-readable instructions are configured to cause the processor to perform:
  in response to the drag direction being same as the progress control direction of the progress bar, adjusting the progress bar of the video data from the first progress position to a second progress position based on a first drag progress value to which the drag length is mapped, wherein the second progress position is greater than the first progress position, and a progress difference between the second progress position and the first progress position is the first drag progress value; and
  in response to the drag direction being opposite to the progress control direction of the progress bar, adjusting the progress bar of the video data from the first progress position to a third progress position based on a second drag progress value to which the drag length is mapped, wherein the third progress position is less than the first progress position, and a progress difference between the first progress position and the third progress position is the second drag progress value.

* * * * *